(12) United States Patent
Ishizaka et al.

(10) Patent No.: US 11,975,570 B2
(45) Date of Patent: May 7, 2024

(54) TIRE

(71) Applicant: The Yokohama Rubber Co., LTD., Tokyo (JP)

(72) Inventors: Takahide Ishizaka, Kanagawa (JP); Hiroto Kikuchi, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 224 days.

(21) Appl. No.: 17/206,847

(22) Filed: Mar. 19, 2021

(65) Prior Publication Data
US 2021/0300122 A1 Sep. 30, 2021

(30) Foreign Application Priority Data

Mar. 31, 2020 (JP) ................................ 2020-064441
Mar. 31, 2020 (JP) ................................ 2020-064583

(51) Int. Cl.
*B60C 11/13* (2006.01)
*B60C 11/03* (2006.01)

(52) U.S. Cl.
CPC ...... *B60C 11/0309* (2013.01); *B60C 11/1315* (2013.01); *B60C 11/1323* (2013.01); *B60C 11/1353* (2013.01); *B60C 2011/0346* (2013.01)

(58) Field of Classification Search
CPC ............. B60C 11/1315; B60C 11/0306; B60C 11/0309; B60C 2011/0346; B60C 11/1323
See application file for complete search history.

(56) References Cited

U.S. PATENT DOCUMENTS

| 4,271,886 A | * | 6/1981 | Bachmann | ............... | B60C 11/04 |
| | | | | | 152/209.27 |
| 4,284,115 A | * | 8/1981 | Ohnishi | ............... | B60C 11/1323 |
| | | | | | 152/900 |
| 5,099,899 A | * | 3/1992 | Takeuchi | ............... | B60C 11/042 |
| | | | | | 152/DIG. 3 |
| 2003/0005992 A1 | * | 1/2003 | Radulescu | ............ | B60C 11/124 |
| | | | | | 152/209.3 |

(Continued)

FOREIGN PATENT DOCUMENTS

DE 11 2017 006 789 T5 11/2019
EP 2 039 534 A1 3/2009

(Continued)

OTHER PUBLICATIONS

English machine translation of JP-H11123909-A. (Year: 1999).*
English machine translation of JP-2015081010-A. (Year: 2015).*

*Primary Examiner* — Robert C Dye
(74) *Attorney, Agent, or Firm* — Thorpe North & Western

(57) ABSTRACT

A tire includes a pair of shoulder main grooves and one or more center main grooves extending in a tire circumferential direction and four or more rows of land portions defined by the pair of shoulder main grooves and the one or more center main grooves. Each of the pair of shoulder main grooves includes a groove opening portion having a wave-like shape with an amplitude in a tire width direction. Each of the pair of shoulder main grooves includes a groove bottom portion having a zigzag shape with an amplitude in the tire width direction. The groove opening portion in each of the pair of shoulder main grooves has an amplitude $A1\_sh$ having a relationship $A1\_sh < A2\_sh$ with respect to an amplitude $A2\_sh$ of the groove bottom portion.

19 Claims, 23 Drawing Sheets

(56) References Cited

U.S. PATENT DOCUMENTS

| | | | |
|---|---|---|---|
| 2007/0151645 A1* | 7/2007 | Mathews | B60C 11/047 152/900 |
| 2012/0118458 A1 | 5/2012 | Tobino | |
| 2014/0326381 A1 | 11/2014 | Hamanaka | |
| 2015/0151585 A1 | 6/2015 | Fujioka | |
| 2016/0001599 A1 | 1/2016 | Minami | |
| 2016/0137006 A1 | 5/2016 | Yamamoto | |
| 2016/0159158 A1 | 6/2016 | Washizuka | |
| 2016/0318352 A1 | 11/2016 | Hibino | |
| 2016/0347125 A1* | 12/2016 | Itou | B60C 11/1236 |
| 2018/0326792 A1* | 11/2018 | Takano | B60C 11/1204 |
| 2019/0366775 A1 | 12/2019 | Suzuki et al. | |
| 2022/0032691 A1 | 2/2022 | Wada et al. | |

FOREIGN PATENT DOCUMENTS

| | | |
|---|---|---|
| EP | 2 357 094 A2 | 8/2011 |
| EP | 2 949 482 A1 | 12/2015 |
| EP | 3 135 504 A1 | 3/2017 |
| EP | 3 335 908 A1 | 6/2018 |
| GB | 2 170 153 A | 7/1986 |
| JP | H02-283504 A | 11/1990 |
| JP | H03-079406 A | 4/1991 |
| JP | H03-136911 A | 6/1991 |
| JP | H03-231001 A | 10/1991 |
| JP | H11123909 A * | 5/1999 |
| JP | 2002-114011 A | 4/2002 |
| JP | 2003-127616 A | 5/2003 |
| JP | 2006-051836 A | 2/2006 |
| JP | 2008-273301 A | 11/2008 |
| JP | 2009-006771 A | 1/2009 |
| JP | 2012-101719 A | 5/2012 |
| JP | 2015081010 A * | 4/2015 |
| JP | 2016-068635 A | 5/2016 |
| JP | 2017-030564 A | 2/2017 |
| JP | 2017-071279 A | 4/2017 |
| JP | 2017-154708 A | 9/2017 |
| JP | 2018-012484 A | 1/2018 |
| JP | 2018-020735 A | 2/2018 |
| JP | 2019-081490 A | 5/2019 |
| JP | 2019-131152 A | 8/2019 |
| JP | 2019-182341 A | 10/2019 |
| WO | WO 2013/042257 A1 | 3/2013 |
| WO | WO 2020/066404 A1 | 4/2020 |

* cited by examiner

| | CONVENTIONAL EXAMPLE 1 | CONVENTIONAL EXAMPLE 2 | EXAMPLE 1 | EXAMPLE 2 | EXAMPLE 3 | EXAMPLE 4 | EXAMPLE 5 |
|---|---|---|---|---|---|---|---|
| GROOVE OPENING PORTION IN SHOULDER MAIN GROOVE | STRAIGHT | ZIGZAG | ZIGZAG | ZIGZAG | ZIGZAG | ZIGZAG | ZIGZAG |
| GROOVE BOTTOM PORTION IN SHOULDER MAIN GROOVE | STRAIGHT | ZIGZAG | ZIGZAG | ZIGZAG | ZIGZAG | ZIGZAG | ZIGZAG |
| GROOVE OPENING PORTION IN CENTER MAIN GROOVE | STRAIGHT | ZIGZAG | ZIGZAG | ZIGZAG | ZIGZAG | ZIGZAG | ZIGZAG |
| GROOVE BOTTOM PORTION IN CENTER MAIN GROOVE | STRAIGHT | ZIGZAG | ZIGZAG | ZIGZAG | ZIGZAG | ZIGZAG | ZIGZAG |
| $A2o\_sh/A1o\_sh, A2i\_sh/A1i\_sh$ | - | 1.00 | 1.10 | 1.25 | 1.69 | 6.04 | 1.69 |
| $A1o\_sh, A1i\_sh$ (mm) | - | 2.40 | 2.40 | 2.40 | 2.40 | 2.40 | 2.40 |
| $A2o\_sh, A2i\_sh$ (mm) | - | 2.40 | 2.64 | 3.00 | 4.05 | 14.5 | 4.05 |
| $A2o\_ce/A1o\_ce, A2i\_ce/A1i\_ce$ | - | 1.00 | 1.00 | 1.00 | 1.00 | 1.00 | 1.05 |
| $A1o\_ce, A1i\_ce$ (mm) | - | 2.00 | 2.00 | 2.00 | 2.00 | 2.00 | 2.00 |
| $A2o\_ce, A2i\_ce$ (mm) | - | 2.00 | 2.00 | 2.00 | 2.00 | 2.00 | 2.10 |
| $A1o\_ce/A1\_sh, A1i\_ce/A1\_sh$ | - | 0.83 | 0.83 | 0.83 | 0.83 | 0.83 | 0.83 |
| $A2o\_ce/A2o\_sh, A2i\_ce/A2i\_sh$ | - | 0.83 | 0.76 | 0.67 | 0.49 | 0.14 | 0.52 |
| $\lambda 2o\_sh/TW, \lambda 2i\_sh/TW$ | - | 0.11 | 0.11 | 0.11 | 0.11 | 0.11 | 0.11 |
| $\lambda 2o\_ce/TW, \lambda 2i\_ce/TW$ | - | 0.11 | 0.11 | 0.11 | 0.11 | 0.11 | 0.11 |
| $\lambda 1o\_ce/\lambda 1o\_sh, \lambda 1i\_se/\lambda 1i\_sh$ | - | 1.00 | 1.00 | 1.00 | 1.00 | 1.00 | 1.00 |
| ACCELERATION PERFORMANCE ON SNOW | 100 | 102 | 102 | 103 | 103 | 103 | 104 |
| UNEVEN WEAR RESISTANCE PERFORMANCE | 100 | 90 | 100 | 100 | 100 | 100 | 100 |
| TEAR RESISTANCE PERFORMANCE | 100 | 110 | 102 | 103 | 105 | 105 | 106 |

FIG. 20A

| | EXAMPLE 6 | EXAMPLE 7 | EXAMPLE 8 | EXAMPLE 9 | EXAMPLE 10 | EXAMPLE 11 | EXAMPLE 12 | EXAMPLE 13 |
|---|---|---|---|---|---|---|---|---|
| GROOVE OPENING PORTION IN SHOULDER MAIN GROOVE | ZIGZAG | ZIGZAG | ZIGZAG | ZIGZAG | ZIGZAG | ZIGZAG | WAVY | WAVY |
| GROOVE BOTTOM PORTION IN SHOULDER MAIN GROOVE | ZIGZAG | ZIGZAG | ZIGZAG | ZIGZAG | ZIGZAG | ZIGZAG | ZIGZAG | ZIGZAG |
| GROOVE OPENING PORTION IN CENTER MAIN GROOVE | ZIGZAG | ZIGZAG | ZIGZAG | ZIGZAG | ZIGZAG | ZIGZAG | ZIGZAG | WAVY |
| GROOVE BOTTOM PORTION IN CENTER MAIN GROOVE | ZIGZAG | ZIGZAG | ZIGZAG | ZIGZAG | ZIGZAG | ZIGZAG | ZIGZAG | ZIGZAG |
| $A2o\_sh/A1o\_sh, A2i\_sh/A1i\_sh$ | 1.69 | 1.69 | 1.69 | 1.69 | 1.69 | 1.69 | 1.69 | 1.69 |
| $A1o\_sh, A1i\_sh$ (mm) | 2.40 | 2.40 | 2.40 | 2.40 | 2.40 | 2.40 | 2.40 | 2.40 |
| $A2o\_sh, A2i\_sh$ (mm) | 4.05 | 4.05 | 4.05 | 4.05 | 4.05 | 4.05 | 4.05 | 4.05 |
| $A2o\_ce/A1o\_ce, A2i\_ce/A1i\_ce$ | 1.11 | 7.25 | 1.11 | 1.11 | 1.11 | 1.11 | 1.11 | 1.11 |
| $A1o\_ce, A1i\_ce$ (mm) | 2.00 | 2.00 | 2.00 | 2.00 | 2.00 | 2.00 | 2.00 | 2.00 |
| $A2o\_ce, A2i\_ce$ (mm) | 2.22 | 14.5 | 2.22 | 2.22 | 2.22 | 2.22 | 2.22 | 2.22 |
| $A1o\_ce/A1\_ce/A1i\_sh$ | 0.83 | 0.83 | 0.83 | 0.83 | 0.83 | 0.83 | 0.83 | 0.83 |
| $A2o\_ce/A2o\_sh, A2i\_ce/A2i\_sh$ | 0.55 | 3.58 | 0.55 | 0.55 | 0.55 | 0.55 | 0.55 | 0.55 |
| $\lambda2o\_sh/TW, \lambda2i\_sh/TW$ | 0.11 | 0.11 | 0.12 | 0.14 | 0.16 | 0.34 | 0.34 | 0.34 |
| $\lambda2o\_ce/TW, \lambda2i\_ce/TW$ | 0.11 | 0.11 | 0.12 | 0.14 | 0.16 | 0.34 | 0.34 | 0.34 |
| $\lambda1o\_ce/\lambda1o\_sh, \lambda1i\_se/\lambda1i\_sh$ | 1.00 | 1.00 | 1.00 | 1.00 | 1.00 | 1.00 | 1.00 | 1.00 |
| ACCELERATION PERFORMANCE ON SNOW | 104 | 105 | 105 | 105 | 105 | 105 | 105 | 105 |
| UNEVEN WEAR RESISTANCE PERFORMANCE | 100 | 100 | 100 | 100 | 100 | 100 | 103 | 105 |
| TEAR RESISTANCE PERFORMANCE | 107 | 108 | 109 | 109 | 110 | 110 | 110 | 110 |

FIG. 20B

| SHAPE OF NARROW SHALLOW GROOVE | COMPARATIVE EXAMPLE | EXAMPLE 14 | EXAMPLE 15 | EXAMPLE 16 | EXAMPLE 17 | EXAMPLE 18 | EXAMPLE 19 | EXAMPLE 20 | EXAMPLE 21 | EXAMPLE 22 | EXAMPLE 23 | EXAMPLE 24 |
|---|---|---|---|---|---|---|---|---|---|---|---|---|
| | FIG. 20 | FIG. 3 | FIG. 3 | FIG. 3 | FIG. 3 | FIG. 3 | FIG. 3 | FIG. 3 | FIG. 3 | FIG. 3 | FIG. 3 | FIG. 3 |
| Wn (mm) | 6.0 | 6.0 | 4.0 | 0.8 | 0.8 | 0.8 | 0.8 | 0.8 | 0.8 | 0.8 | 0.8 | 0.8 |
| Hn/Hgl | 0.40 | 0.40 | 0.20 | 0.20 | 0.20 | 0.20 | 0.20 | 0.20 | 0.20 | 0.20 | 0.20 | 0.20 |
| W11/Wb1 | 1.00 | 0.55 | 0.55 | 0.55 | 0.60 | 0.75 | 0.75 | 0.75 | 0.75 | 0.75 | 0.75 | 0.75 |
| L11/P11 | - | 0.50 | 0.50 | 0.50 | 0.50 | 0.50 | 0.60 | 0.65 | 0.65 | 0.65 | 0.65 | 0.65 |
| D1/P11 | - | 0.50 | 0.50 | 0.50 | 0.50 | 0.50 | 0.50 | 0.50 | 0.50 | 0.50 | 0.50 | 0.50 |
| D2/Wb1 | - | 0 | 0 | 0 | 0 | 0 | 0 | 0 | 0 | 0 | 0 | 0 |
| θ11 (deg) | - | 90 | 90 | 90 | 90 | 90 | 80 | 75 | 75 | 75 | 75 | 75 |
| ΣLa/W11 | (2.00) | 1.20 | 1.20 | 1.20 | 1.20 | 1.20 | 1.20 | 1.20 | 1.40 | 1.60 | 1.60 | 1.60 |
| Lb/L11 | - | 0.50 | 0.50 | 0.50 | 0.50 | 0.50 | 0.50 | 0.50 | 0.50 | 0.50 | 0.65 | 0.75 |
| ACCELERATION PERFORMANCE ON SNOW | 100 | 96 | 96 | 96 | 98 | 101 | 102 | 102 | 103 | 104 | 105 | 106 |
| PASS-BY NOISE PERFORMANCE (dB DIFFERENCe) | 0 | -0.1 | -0.2 | -0.3 | -0.3 | -0.3 | -0.3 | -0.4 | -0.4 | -0.4 | -0.4 | -0.4 |

FIG. 21

CONVENTIONAL EXAMPLE

TIRE

RELATED APPLICATION

This application is based upon and claims the benefit of priority from Japanese Patent Application No. 2020-064441, filed Mar. 31, 2020, and Japanese Patent Application No. 2020-064583, filed Mar. 31, 2020, the entire contents of which is incorporated herein by reference.

TECHNICAL FIELD

The technology relates to a tire and particularly relates to a tire that can provide acceleration performance on snow, uneven wear resistance performance, and tear resistance performance in a compatible manner.

BACKGROUND ART

Heavy duty tires in the related art employ main grooves having zigzag shapes to enhance acceleration performance on snow of tires. As an example of the tire in the related art that employs the configuration, a technology described in Japan Unexamined Patent Publication No. 2017-154708 has been known.

On the other hand, the heavy duty tire mounted on a steering axle of a vehicle has a problem in that uneven wear (in particular, a railway wear in an edge portion of a land portion) and a tear of the land portion caused by the above-described zigzag shapes of the main grooves are likely to occur.

SUMMARY

The technology provides a tire that can provide acceleration performance on snow, uneven wear resistance performance, and tear resistance performance in a compatible manner.

A tire includes a pair of shoulder main grooves and one or more center main grooves and four or more rows of land portions. The pair of shoulder main grooves and the one or more center main grooves extend in a tire circumferential direction. The four or more rows of land portions are defined by the pair of shoulder main grooves and the one or more center main grooves. Each of the pair of shoulder main grooves includes a groove opening portion having a straight shape, or a zigzag shape or a wave-like shape with an amplitude in a tire width direction. Each of the pair of shoulder main grooves includes a groove bottom portion having a zigzag shape or a wave-like shape with an amplitude in the tire width direction. The groove opening portion in each of the pair of shoulder main grooves has an amplitude $A1\_sh$ having a relationship $A1\_sh < A2\_sh$ with respect to an amplitude $A2\_sh$ of the groove bottom portion.

In the tire according to an embodiment of the technology, (1) since the amplitude $A1\_sh$ of the groove opening portion in the shoulder main groove is set to be small, railway wear of an edge portion of the land portion, which is likely to occur at a maximum amplitude position to the shoulder main groove side, is suppressed. Additionally, (2) since the amplitude $A2\_sh$ of the groove bottom portion in the shoulder main groove is set to be large, rigidity of the land portion is ensured, and tear resistance performance of the tire is ensured. Furthermore, (3) the groove opening portion in the shoulder main groove has the zigzag shape or the wave-like shape with the amplitude in the tire width direction, so edge components of the land portions are increased, and acceleration performance on snow of the tire is improved. This is advantageous in that acceleration performance on snow, uneven wear resistance performance, and tear resistance performance of the tire are provided in a compatible manner.

BRIEF DESCRIPTION OF DRAWINGS

FIGS. 20A-20B include a table showing results of performance tests of tires according to embodiments of the technology.

FIG. 21 is a table showing results of performance tests of tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency with the technology, and obviously substitutable elements. Furthermore, the modified examples described in the embodiments can be combined as desired within the scope apparent to one skilled in the art.

Tire

Figure 1:
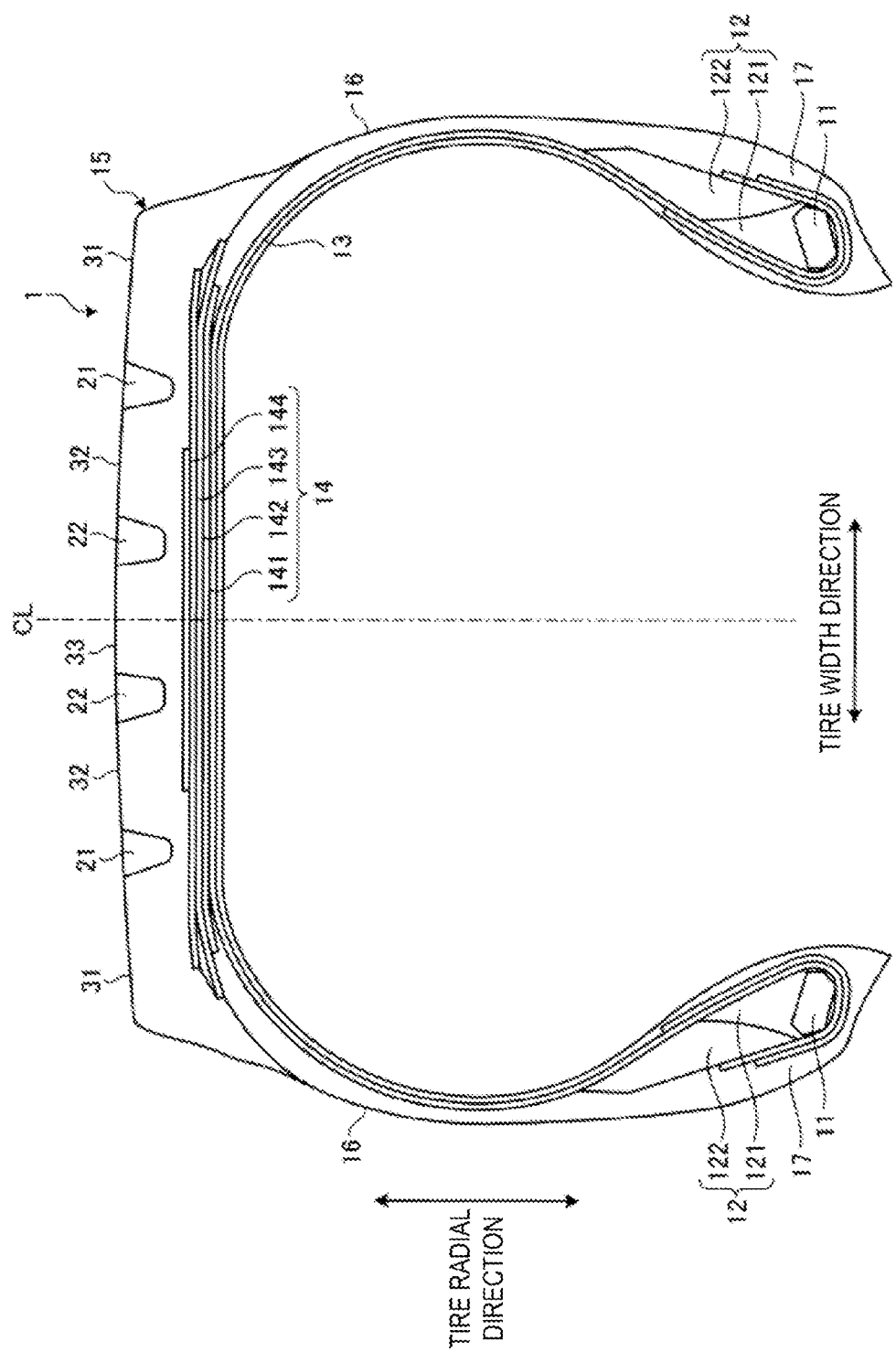
FIG. 1 is a cross-sectional view in a tire meridian direction illustrating a tire according to an embodiment of the technology.

FIG. 1 is a cross-sectional view in a tire meridian direction illustrating the tire according to an embodiment of the technology. The same drawing illustrates a cross-sectional view of a half region in the tire radial direction. In the embodiments, a pneumatic radial tire for heavy duty mounted to a steering axle of a truck and a tractor will be described as an example of the tire.

In reference to the same drawing, "cross section in a tire meridian direction" refers to a cross section of the tire taken along a plane that includes the tire rotation axis (not illustrated). Reference sign CL denotes the tire equatorial plane and refers to a plane normal to the tire rotation axis that passes through the center point of the tire in the tire rotation axis direction. "Tire width direction" refers to the direction parallel with the tire rotation axis. "Tire radial direction" refers to the direction perpendicular to the tire rotation axis.

A tire 1 has an annular structure with the tire rotation axis as its center and includes: a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 are formed by winding one or a plurality of bead wires made of steel by multiple times in an annular shape and are embedded in the bead portion to constitute a core of the left and right bead portions. The pair of bead fillers 12, 12 are disposed outward of the pair of bead cores 11, 11 in the tire radial direction and reinforce the bead portions.

The carcass layer 13 has a single layer structure made from one carcass ply or a multilayer structure made from a plurality of stacked carcass plies and spans between the left and right bead cores 11, 11 in a toroidal shape to form the framework of the tire. Additionally, both end portions of the carcass layer 13 are turned back to the outer side in the tire width direction so as to wrap around the bead cores 11 and the bead fillers 12 and fixed. The carcass ply of the carcass layer 13 is formed by performing a rolling process on coating a plurality of rubber-covered carcass cords made of steel or an organic fiber material (for example, aramid, nylon, polyester, or rayon) and has a carcass angle (defined as an inclination angle in a longitudinal direction of the carcass cords with respect to the tire circumferential direction) ranging from 80 degrees to 100 degrees as an absolute value.

The belt layer 14 is formed by layering four layers of belt plies 141 to 144, and is disposed by being wound around the outer circumference of the carcass layer 13. The belt plies 141 to 144 are made by performing a rolling process on coating a plurality of rubber-covered belt cords made of steel or an organic fiber material. The belt cover 144 has a belt angle, as an absolute value, ranging from 15 degrees to 55 degrees. Furthermore, the belt plies 141 to 144 have belt angles (defined as an inclination angle in a longitudinal direction of the belt cords with respect to the tire circumferential direction) of mutually opposite signs and are layered so that the longitudinal directions of the belt cords intersect with each other (a so-called crossply structure).

The tread rubber 15 is disposed outward of the carcass layer 13 and the belt layer 14 in the tire radial direction, and forms a tread portion of the tire 1. The pair of sidewall rubbers 16, 16 are disposed on the outer side of the carcass layer 13 in the tire width direction and constitute left and right sidewall portions. The pair of rim cushion rubbers 17, 17 extend from the inner sides in the tire radial direction of the turned back portions of the carcass layer 13 and the left and right bead cores 11, 11 toward the outer side in the tire width direction to form a rim-fitting surface of the bead portion.

Tread Pattern

Figure 2:
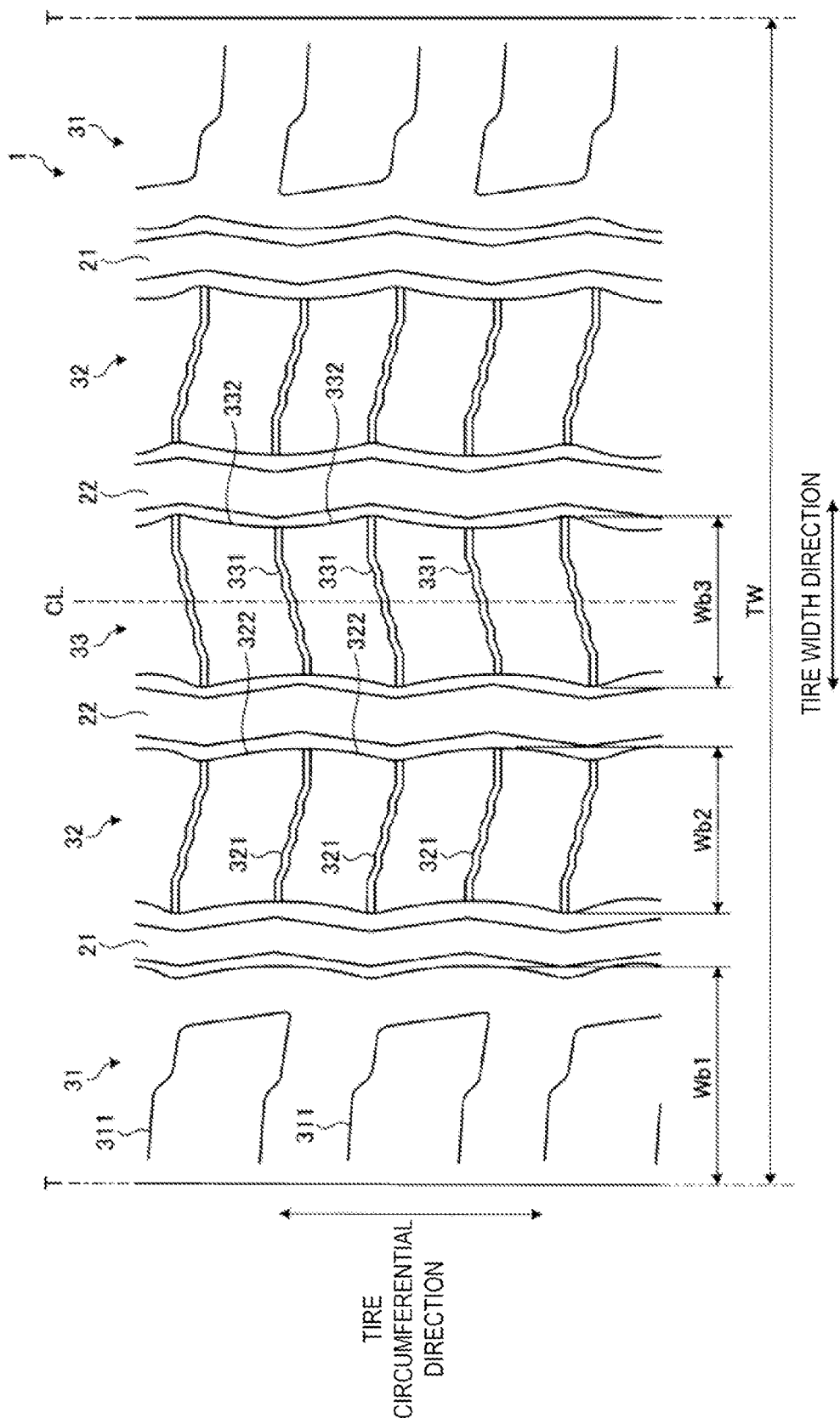
FIG. 2 is a plan view illustrating a tread surface of the tire illustrated in FIG. 1.

FIG. 2 is a plan view illustrating a tread surface of the tire 1 illustrated in FIG. 1. The identical drawing illustrates a tread surface of an all-season tire having the mud and snow mark "M+S". In reference to the same drawing, "tire circumferential direction" refers to the direction revolving about the tire rotation axis. Reference sign T denotes a tire ground contact edge, and dimension sign TW denotes a tire ground contact width.

As illustrated in FIG. 2, the tire 1 includes: a plurality of circumferential main grooves 21, 22 extending in the tire circumferential direction and a plurality of land portions 31, 32, 33 defined by the circumferential main grooves 21, 22 in the tread surface.

"Main groove" refers to a groove on which a wear indicator must be provided as specified by JATMA (The Japan Automobile Tyre Manufacturers Association, Inc.) and has the maximum groove width of not less than 7.0 mm and the maximum groove depth of not less than 12 mm.

The groove width is measured as the distance between the left and right groove walls at the groove opening portion when the tire is mounted on a specified rim, inflated to the specified internal pressure, and in an unloaded state. In a configuration in which the land portions include notch portions or chamfered portions in the edge portions thereof, the groove width is measured with reference to the intersection points between the tread contact surface and the extension lines of the groove walls as measurement points, in a cross-sectional view in which the groove length direction is a normal direction.

The groove depth is measured as a distance from the tread contact surface to the groove bottom when the tire is mounted on a specified rim, inflated to the specified internal pressure, and in an unloaded state. Additionally, in a configuration in which the grooves include an uneven portion or sipes on the groove bottom, the groove depth is measured excluding these portions.

"Specified rim" refers to a "standard rim" defined by JATMA, a "Design Rim" defined by TRA (The Tire & Rim Association, Inc.), or a "Measuring Rim" defined by ETRTO (The European Tyre and Rim Technical Organisation). Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in the case of JATMA, for a passenger vehicle tire, the specified internal pressure is an air pressure of 180 kPa, and the specified load is 88% of the maximum load capacity.

For example, in the configuration of FIG. 2, the tire 1 has a substantially point symmetric tread pattern having a center point on a tire equatorial plane CL. However, no such limitation is intended, and, for example, the tire 1 may have a left-right axisymmetric tread pattern or a left-right asymmetric tread pattern with the tire equatorial plane CL as the center, or may have a tread pattern having directionality in the tire rotation direction (not illustrated).

Furthermore, in the configuration of FIG. 2, the left and right regions demarcated by the tire equatorial plane CL each have two circumferential main grooves 21, 22. These circumferential main grooves 21, 22 are disposed in left-right symmetry with respect to the tire equatorial plane CL as the center. Five rows of land portions 31 to 33 are defined by these circumferential main grooves 21, 22. In addition, one land portion 33 is disposed on the tire equatorial plane CL.

However, no such limitation is intended, and three, or five or more circumferential main grooves may be disposed, or the circumferential main grooves may be arranged asymmetrically with respect to the tire equatorial plane CL (not illustrated). In addition, the land portion may be arranged at a position off from the tire equatorial plane CL, with one circumferential main groove being arranged on the tire equatorial plane CL (not illustrated).

Additionally, among the circumferential main grooves 21, 22 disposed in one region demarcated by the tire equatorial plane CL, the circumferential main groove 21 on the outermost side in the tire width direction is defined as the shoulder main groove, and the circumferential main groove 22 close to the tire equatorial plane CL is defined as the center main groove.

The land portion 31 located on the outer side in the tire width direction defined by the shoulder main groove 21 is defined as a shoulder land portion. The shoulder land portion 31 is a land portion on the outermost side in the tire width direction and is located on the tire ground contact edge T. The land portion 32 located on the inner side in the tire width direction defined by the shoulder main groove 21 is defined as a middle land portion. The middle land portion 32 is adjacent to the shoulder land portion 31 with the shoulder main groove 21 disposed therebetween. Furthermore, the land portion 33 located closer to the tire equatorial plane CL than the middle land portion 32 is defined as a center land portion. The center land portion 33 may be disposed on the tire equatorial plane CL (see FIG. 2) or may be arranged at a position off from the tire equatorial plane CL (not illustrated).

The tire ground contact width TW is measured as the maximum linear distance in the tire axial direction of a contact surface between the tire and a flat plate when the tire is mounted on a specified rim, inflated to the specified internal pressure, placed perpendicular to the flat plate in a static state, and loaded with a load corresponding to the specified load.

The tire ground contact edge T is defined as the maximum width position in the tire axial direction of the contact surface between the tire and a flat plate when the tire is mounted on a specified rim, inflated to the specified internal pressure, placed perpendicular to the flat plate in a static state, and loaded with a load corresponding to the specified load.

Note that in the configuration including the four circumferential main grooves 21, 22 as in FIG. 2, a pair of the shoulder land portions 31, 31, a pair of the middle land portions 32, 32, and the single center land portion 33 are defined. Additionally, for example, in a configuration including five or more circumferential main grooves, two or more rows of center land portions are defined (not illustrated). Moreover, in a configuration including three circumferential main grooves, the middle land portion also serves as the center land portion (not illustrated).

Additionally, in the configuration of FIG. 2, a maximum ground contact width Wb1 of the shoulder land portion 31 has the relationship $0.15 \leq Wb1/TW \leq 0.25$ with respect to the tire ground contact width TW. Additionally, a maximum ground contact width Wb3 of the center land portion 33 closest to the tire equatorial plane CL preferably has the relationship $0.15 \leq Wb3/TW \leq 0.25$ with respect to the tire ground contact width TW, and more preferably has the relationship $0.18 \leq Wb3/TW \leq 0.23$. Additionally, in the configuration including the four circumferential main grooves 21, 22 and five rows of the land portions 31 to 33 as in FIG. 2, a maximum ground contact width Wb2 of the middle land portion 32 is preferably slightly narrower than the maximum ground contact width Wb1 of the shoulder land portion 31, and specifically, in the range $0.85 \leq Wb2/Wb1 \leq 0.95$.

Additionally, in the configuration of FIG. 2, the shoulder main groove 21 and the center main groove 22 have zigzag shapes or wave-like shapes with amplitudes in the tire width direction. However, no such limitation is intended, and as described later, the shoulder main groove 21 and the center main groove 22 may have straight shapes in groove opening portions (not illustrated).

The shoulder land portion 31 is a rib having a road contact surface continuous in the tire circumferential direction, and does not include lug grooves. In addition, the middle land portion 32 and the center land portion 33 include a plurality of through lug grooves 321, 331, respectively. The through lug grooves 321, 331 have an open structure in which the through lug grooves 321, 331 penetrate the land portions 32, 33, and are disposed at predetermined intervals in the tire circumferential direction. As a result, the middle land portion 32 and the center land portion 33 are divided in the tire circumferential direction by the through lug grooves 321, 331, thus forming block rows.

Groove Width Structure of Shoulder Main Groove

Figure 3:
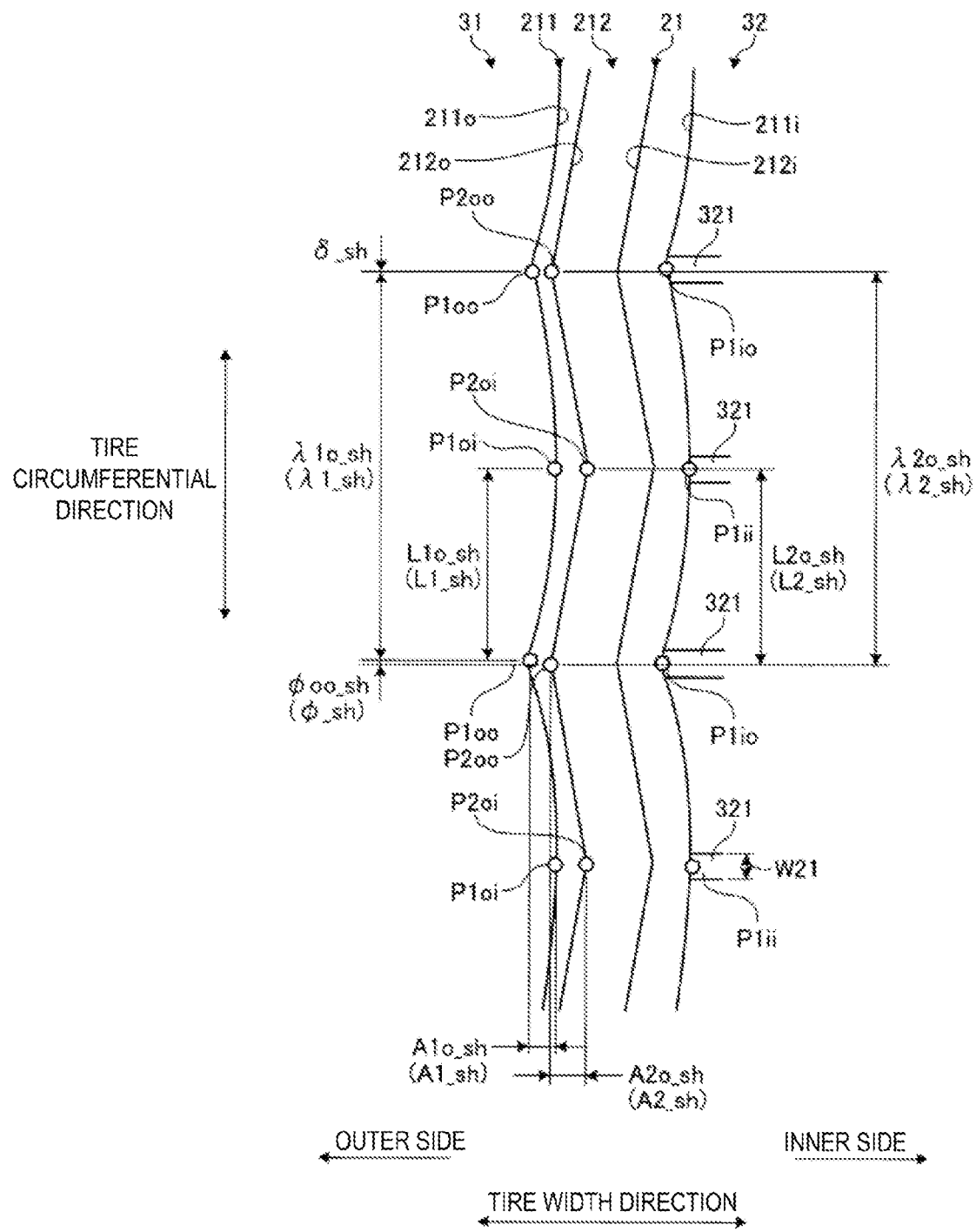
FIG. 3 is an enlarged plan view illustrating a groove wall structure of a shoulder main groove illustrated in FIG. 2.
Figure 4:
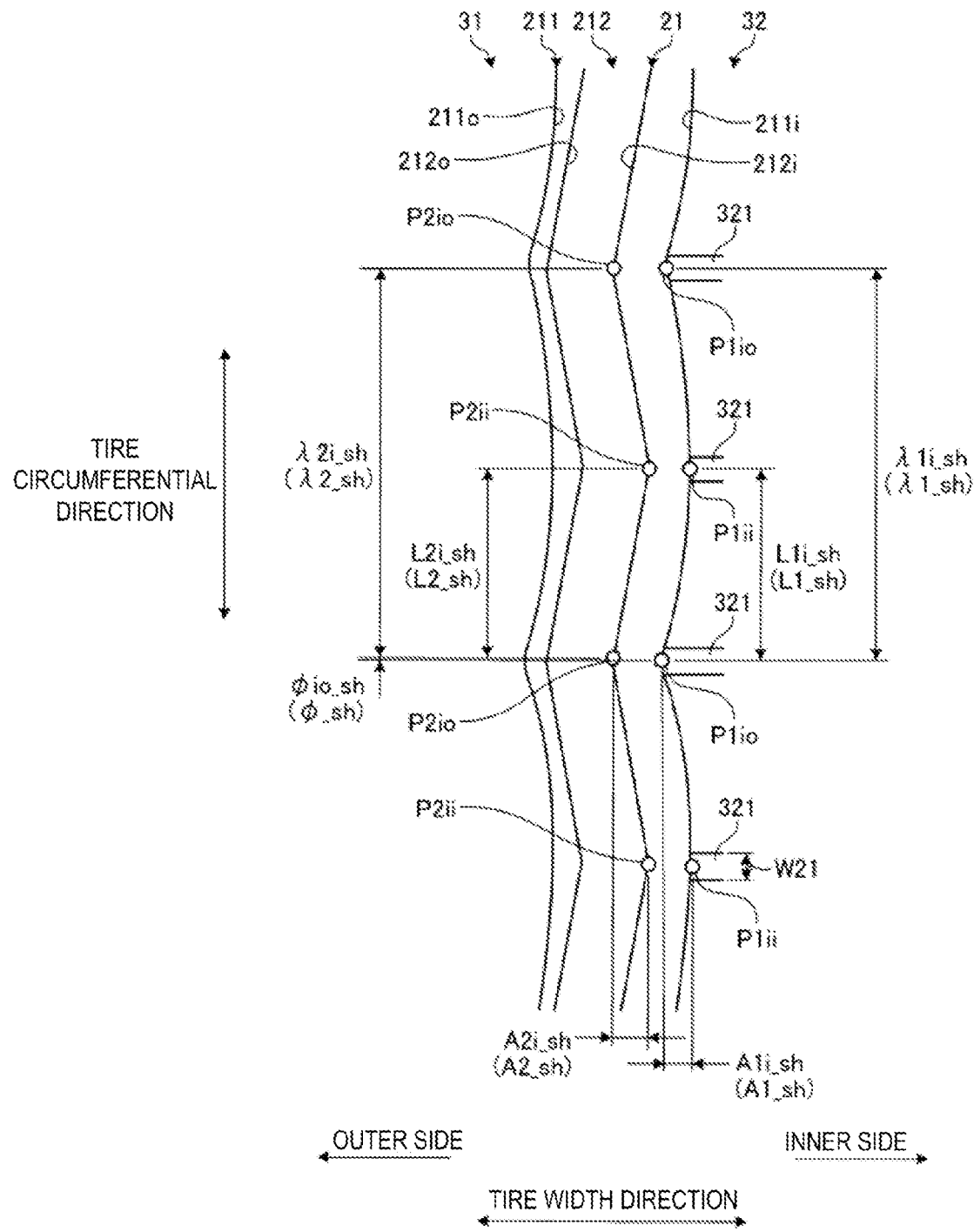
FIG. 4 is an enlarged plan view illustrating the groove wall structure of the shoulder main groove illustrated in FIG. 2.
Figure 5:
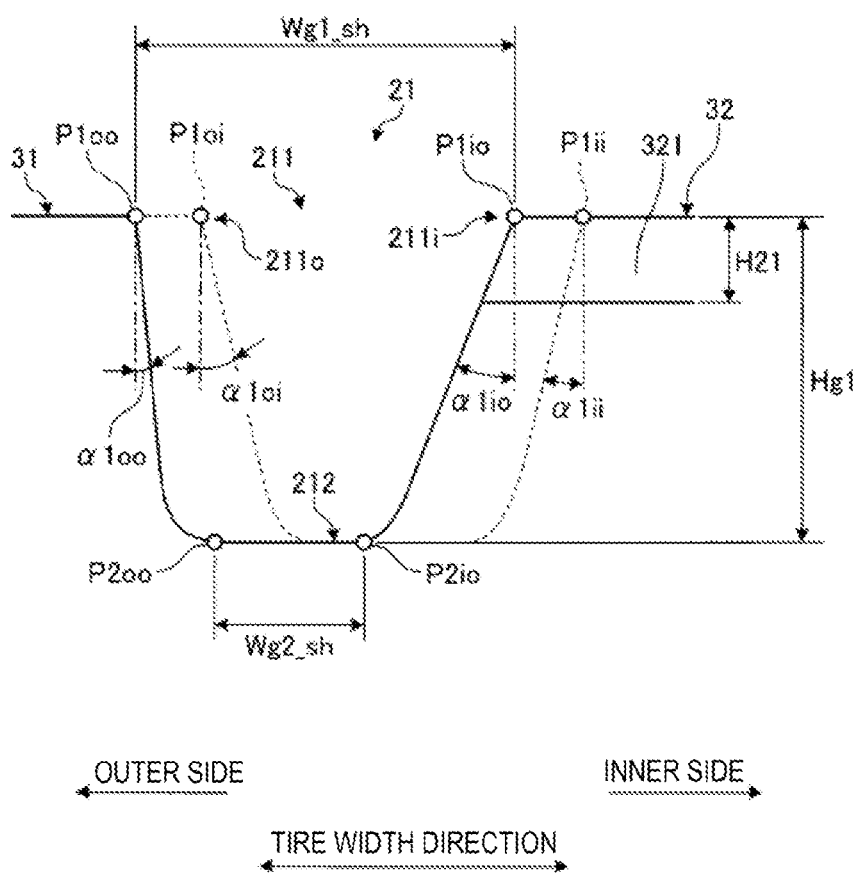
FIG. 5 is a cross-sectional view in a groove depth direction of the shoulder main groove illustrated in FIG. 2.

FIGS. 3 to 5 are enlarged plan views (FIGS. 3 and 4) and a cross-sectional view (FIG. 5) in the groove depth direction illustrating the groove wall structure of the shoulder main groove 21 illustrated in FIG. 2. In these drawings, FIG. 3 specifically illustrates the groove wall structure on the outer side in the tire width direction of the shoulder main groove 21, and FIG. 4 specifically illustrates the groove wall structure on the inner side in the tire width direction. FIG. 5 illustrates the cross-sectional view at maximum amplitude positions of the shoulder main groove 21 to the outer side in the tire width direction.

In the configuration of FIG. 2, as illustrated in FIG. 3, both a groove opening portion 211 and a groove bottom portion 212 in the shoulder main groove 21 have a zigzag shape or a wave-like shape with the amplitude in the tire width direction. However, no such limitation is intended, and the groove opening portion 211 in the shoulder main groove 21 may have a straight shape (not illustrated).

Here, in the respective groove opening portion and groove bottom portion in the main groove, outer edge portions and inner edge portions in the tire width direction are defined. Additionally, in the respective outer edge portions and inner edge portions, outer maximum amplitude positions that project to the outer side in the tire width direction and inner maximum amplitude positions that project to the inner side in the tire width direction are defined.

The edge portion of the groove opening portion is defined by an imaginary line connecting intersection points (see, for example, FIG. 5) of groove walls and a tread profile in a cross-sectional view in the groove depth direction across the entire region in the tire circumferential direction. In a configuration in which the edge portion includes a chamfered portion, an imaginary line of the edge portion of the groove opening portion is drawn by connecting intersection points (not illustrated) of extension lines of groove walls and a tread profile.

The edge portion of the groove bottom portion is defined by an imaginary line connecting end points of maximum groove depth positions in the cross-sectional view in the groove depth direction across the entire region in the tire circumferential direction. When the groove bottom portion of the main groove is a flat straight line at the maximum groove depth position (see, for example, FIG. 5), the outer edge portion and the inner edge portion of the groove bottom portion are defined at respective both end points of the flat straight line. Meanwhile, when the groove bottom portion of the main groove has an arc shape or a funnel shape (not illustrated), the maximum groove depth position is one point, and the edge portion of the groove bottom portion is defined by one point. Accordingly, the outer edge portion and the inner edge portion of the groove bottom portion described above are at the identical position. The maximum groove depth position of the main groove is defined excluding a raised bottom portion, which is partially formed in the groove bottom portion of the main groove.

In the configuration of FIGS. 3 and 4, the groove opening portion 211 of the shoulder main groove 21 has a wave-like shape with an amplitude in the tire width direction at respective outer edge portion 211$o$ on the shoulder land portion 31 side and inner edge portion 211$i$ on the middle land portion 32 side. Furthermore, the groove bottom portion 212 of the shoulder main groove 21 has a zigzag shape with an amplitude in the tire width direction at respective outer edge portion 212$o$ on the shoulder land portion 31 side and an inner edge portion 212$i$ on the middle land portion 32 side.

As illustrated in FIG. 3, an outer maximum amplitude position P1oo of the outer edge portion 211$o$ of the groove opening portion 211 in the shoulder main groove 21 is at a position in the tire circumferential direction identical to an outer maximum amplitude position P2oo of the outer edge portion 212$o$ of the groove bottom portion 212. Specifically, in FIG. 3, an offset amount φoo_sh between the outer maximum amplitude positions P1oo, P2oo in the outer edge portions 211$o$, 212$o$ of the groove opening portion 211 and the groove bottom portion 212 in the shoulder main groove 21 has the relationship 0≤φoo_sh/λ1o_sh≤0.10 with respect to a wavelength λ1o_sh of the outer edge portion 211$o$ of the groove opening portion 211, and more preferably has the relationship 0≤φoo_sh/λ1o_sh≤0.05.

The offset amount between the maximum amplitude positions is a distance between the maximum amplitude positions in the tire circumferential direction in a tread plan view, and measured when the tire is mounted on a specified rim, inflated to the specified internal pressure, and in an unloaded state.

Similarly, as illustrated in FIG. 4, an outer maximum amplitude position P1io of the inner edge portion 211$i$ of the groove opening portion 211 in the shoulder main groove 21 is at a position in the tire circumferential direction identical to an outer maximum amplitude position P2io of the inner edge portion 212$i$ of the groove bottom portion 212. Specifically, in FIG. 4, an offset amount φio_sh between the outer maximum amplitude positions P1io, P2io in the inner edge portions 211$i$, 212$i$ of the groove opening portion 211 and the groove bottom portion 212 in the shoulder main groove 21 has the relationship 0≤φio_sh/λ1i_sh≤0.10 with respect to a wavelength λ1i_sh of the inner edge portion 211$i$ of the groove opening portion 211, and more preferably has the relationship 0≤φio_sh/λ1i_sh≤0.05.

As illustrated in FIG. 3, the outer maximum amplitude position P1oo of the outer edge portion 211$o$ and the outer maximum amplitude position P1io of the inner edge portion 211$i$ of the groove opening portion 211 in the shoulder main groove 21 are at the identical position in the tire circumferential direction. Specifically, an offset amount δ_sh between the outer maximum amplitude position P1oo in the outer edge portion 211$o$ and the outer maximum amplitude position P1io in the inner edge portion 211$i$ of the groove opening portion 211 in the shoulder main groove 21 has the relationship 0≤δ_sh/λ1o_sh≤0.10 with respect to the wavelength λ1o_sh of the outer edge portion 211$o$ of the groove opening portion 211, and more preferably has the relationship 0≤δ_sh/λ1o_sh≤0.05.

Furthermore, in FIG. 3, the wavelength λ1o_sh of the outer edge portion 211$o$ of the groove opening portion 211 in the shoulder main groove 21 is set to be substantially identical to a wavelength λ2o_sh of the outer edge portion 212$o$ of the groove bottom portion 212. Specifically, the wavelengths λ1o_sh, λ2o_sh of the groove opening portion 211 and the groove bottom portion 212 are in the range 0.90≤λ2o_sh/λ1o_sh≤1.10.

Similarly, in FIG. 4, the wavelength λ1i_sh of the inner edge portion 211$i$ of the groove opening portion 211 in the shoulder main groove 21 is set to be substantially identical to a wavelength λ2i_sh of the inner edge portion 212$i$ of the groove bottom portion 212. Specifically, the wavelengths λ1i_sh, λ2i_sh of the groove opening portion 211 and the groove bottom portion 212 are in the range 0.90≤λ2i_sh/λ1i_sh≤1.10.

Additionally, a wavelength λ2_sh (λ2o_sh, λ2i_sh) of the groove bottom portion 212 in the shoulder main groove 21 has the relationship 0.10≤λ2_sh/TW≤0.35 with respect to the tire ground contact width TW.

Also, in FIG. 3, a maximum distance L1o_sh in the tire circumferential direction between the outer maximum amplitude position P1oo and an inner maximum amplitude position P1oi in the outer edge portion 211$o$ of the groove opening portion 211 in the shoulder main groove 21 has the relationship 0.50≤L1o_sh/λ1o_sh≤0.60 with respect to the wavelength λ1o_sh of the outer edge portion 211$o$, and preferably has the relationship 0.50≤L1o_sh/λ1o_sh≤0.55. This makes rigidity of the tread contact surface of a new tire uniform in the tire circumferential direction.

The maximum distance in the tire circumferential direction between the outer maximum amplitude position and the inner maximum amplitude position is measured as a greater distance among distances in the tire circumferential direction between the adjacent outer maximum amplitude positions and the inner maximum amplitude position disposed between the outer maximum amplitude positions.

The wavelength λ1o_sh of the outer edge portion 211$o$ of the groove opening portion 211 in the shoulder main groove 21 is defined only when the shoulder main groove 21 has the zigzag shape or the wave-like shape and not defined when having the straight shape.

Similarly, in FIG. 4, a maximum distance L1i_sh in the tire circumferential direction between the outer maximum amplitude position P1io and an inner maximum amplitude position P1ii in the inner edge portion 211$i$ of the groove opening portion 211 in the shoulder main groove 21 has the relationship 0.50≤L1i_sh/λ1i_sh≤0.60 with respect to the wavelength λ1i_sh of the inner edge portion 211$i$, and preferably has the relationship 0.50≤L1i_sh/λ1i_sh≤0.55.

Also, in FIG. 3, a maximum distance L2o_sh in the tire circumferential direction between the outer maximum amplitude position P2oo and an inner maximum amplitude position P2oi in the outer edge portion 212*o* of the groove bottom portion 212 in the shoulder main groove 21 has the relationship $0.50 \leq L2o\_sh/\lambda 2o\_sh \leq 0.60$ with respect to the wavelength $\lambda 2o\_sh$ of the outer edge portion 212*o*, and preferably has the relationship $0.50 \leq L2o\_sh/\lambda 2o\_sh \leq 0.55$. Accordingly, the outer maximum amplitude position P2oo and the inner maximum amplitude position P2oi of the groove bottom portion 212 in the shoulder main groove 21 are disposed at substantially equal intervals in the tire circumferential direction.

Similarly, in FIG. 4, a maximum distance L2i_sh in the tire circumferential direction between the outer maximum amplitude position P2io and an inner maximum amplitude position P2ii in the inner edge portion 212*i* of the groove bottom portion 212 in the shoulder main groove 21 has the relationship $0.50 \leq L2i\_sh/\lambda 2i\_sh \leq 0.60$ with respect to the wavelength $\lambda 2i\_sh$ of the inner edge portion 212*i*, and preferably has the relationship $0.50 \leq L2i\_sh/\lambda 2i\_sh \leq 0.55$.

Additionally, in FIG. 3, an amplitude A1o_sh of the outer edge portion 211*o* of the groove opening portion 211 in the shoulder main groove 21 has the relationship $1.20 \leq A2o\_sh/A1o\_sh \leq 2.00$ with respect to an amplitude A2o_sh of the outer edge portion 212*o* of the groove bottom portion 212, and more preferably has the relationship $1.30 \leq A2o\_sh/A1o\_sh \leq 1.80$. Accordingly, the amplitude A2o_sh of the zigzag shape of the groove bottom portion 212 is set to be greater than the amplitude A1o_sh of the wave-like shape of the groove opening portion 211.

Similarly, in FIG. 4, an amplitude A1i_sh of the inner edge portion 211*i* of the groove opening portion 211 in the shoulder main groove 21 has the relationship $1.20 \leq A2i\_sh/A1i\_sh \leq 2.00$ with respect to an amplitude A2i_sh of the inner edge portion 212*i* of the groove bottom portion 212, and more preferably has the relationship $1.30 \leq A2i\_sh/A1i\_sh \leq 1.80$.

In the configuration described above, (1) since the amplitude A1o_sh, A1i_sh of the groove opening portion 211 in the shoulder main groove 21 is set to be small, railway wear of the edge portions of the land portions 31, 32, which is likely to occur at the maximum amplitude positions P1io, P1oi to the shoulder main groove 21 side, is suppressed. Additionally, (2) since the amplitude A2o_sh, A2i_sh of the groove bottom portion 212 in the shoulder main groove 21 is set to be large, the rigidity of the land portions 31, 32 is ensured, and tear resistance performance of the tire is ensured. As a result, the uneven wear resistance performance and the tear resistance performance of the tire are provided in a compatible manner. Furthermore, (3) the groove opening portion 211 of the shoulder main groove 21 has the zigzag shape or the wave-like shape with the amplitude in the tire width direction, so edge components of the land portions 31, 32 are increased, and the acceleration performance on snow of the tire is improved.

Additionally, in FIGS. 3 and 4, the amplitude A1o_sh of the outer edge portion 211*o* of the groove opening portion 211 in the shoulder main groove 21 is set to be substantially identical to the amplitude A1i_sh of the inner edge portion 211*i*. Specifically, the amplitude A1o_sh of the outer edge portion 211*o* has the relationship $0.90 \leq A1o\_sh/A1i\_sh \leq 1.10$ with respect to the amplitude A1i_sh of the inner edge portion 211*i*, and more preferably has the relationship $0.95 \leq A1o\_sh/A1i\_sh \leq 1.05$.

Additionally, the amplitudes A1o_sh, A1i_sh of the groove opening portion 211 in the shoulder main groove 21 are in a range of from not less than 0 mm to not greater than 15.0 mm and preferably in a range of from not less than 2.0 mm to not greater than 10.0 mm. When the amplitudes A1o_sh, A1i_sh are 0 mm, the groove opening portion 211 in the shoulder main groove 21 has the straight shape.

Additionally, the amplitudes A2o_sh, A2i_sh of the groove bottom portion 212 in the shoulder main groove 21 are in a range of from not less than 2.5 mm to not greater than 15.0 mm and preferably in a range of from not less than 4.0 mm to not greater than 12.0 mm.

As illustrated in FIG. 5, a groove wall angle α1oo at the outer maximum amplitude position P1oo of the outer edge portion 211*o* of the groove opening portion 211 in the shoulder main groove 21 has the relationship α1oo<α1oi with respect to a groove wall angle α1oi at the inner maximum amplitude position P1oi of the outer edge portion 211*o*. Similarly, a groove wall angle α1io at the outer maximum amplitude position P1io of the inner edge portion 211*i* of the groove opening portion 211 in the shoulder main groove 21 has the relationship α1ii<α1io with respect to a groove wall angle α1ii at the inner maximum amplitude position P1ii of the inner edge portion 211*i*. Thus, the groove wall angles α1oi, α1io of the shoulder main groove 21 are set to be large at the positions where the edge portion of the groove opening portion in the shoulder main groove 21 projects to the shoulder main groove 21 side (the inner maximum amplitude position P1oi of the outer edge portion 211*o* and the outer maximum amplitude position P1io of the inner edge portion 211*i*, see FIG. 3). As a result, the rigidity of the land portions 31, 32 at the maximum amplitude positions P1oi, P1io is ensured.

Furthermore, as illustrated in FIG. 3, the groove bottom portion 212 in the shoulder main groove 21 is disposed so as to be overall biased to the inner side in the tire width direction with respect to the entire groove opening portion 211. Thus, the average value of the groove wall angles of the inner edge portion 211*i* in the shoulder main groove 21 is set to be greater than the average value of the groove wall angles of the outer edge portion 211*o*. Thus, the rigidity of the narrower middle land portion 32 (see FIG. 2) is ensured.

Additionally, in FIG. 5, a maximum width Wg2_sh of the groove bottom portion 212 in the shoulder main groove 21 has the relationship $0 \leq Wg2\_sh/Wg1\_sh \leq 0.60$ with respect to a maximum width Wg1_sh of the groove opening portion 211 (that is, the maximum groove width of the shoulder main groove 21), and more preferably has the relationship $0.35 \leq Wg2\_sh/Wg1\_sh \leq 0.45$. When the groove bottom portion of the main groove has an arc shape or a funnel shape (not illustrated), the maximum width Wg2_sh of the groove bottom portion 212 becomes substantially 0.

Additionally, in the configuration of FIG. 3, both the outer edge portion 211*o* and the inner edge portion 211*i* of the groove opening portion 211 in the shoulder main groove 21 have a wave-like shape formed by connecting a plurality of arcs projecting to the inner side in the tire width direction (that is, the tire equatorial plane CL side, see FIG. 2). Additionally, a circumferential length of the arc (dimension symbol omitted in drawings) is not less than 80% with respect to the wavelength λ1o_sh of the outer edge portion 211*o*, and more preferably not less than 85%. Additionally, the adjacent arcs are connected via short straight lines or arcs. In such a configuration, compared to a configuration in which the edge portion has a zigzag shape or a sine wave shape, uneven wear at the maximum projection position of the edge portion is suppressed, which is preferred.

However, no such limitation is intended, and the groove opening portion 211 in the shoulder main groove 21 may have the linear shape or the zigzag shape as described above, or may have a wave-like shape of a sine wave shape (not illustrated).

Additionally, in the configuration of FIG. 3, both the outer edge portion 212o and the inner edge portion 212i of the groove bottom portion 212 in the shoulder main groove 21 have the zigzag shape formed by connecting linear portions having the substantially identical length in the tire circumferential direction. Additionally, the circumferential length (substantially equal to the maximum distance L2o_sh in the tire circumferential direction between the maximum amplitude positions P2oo, P2oi in the outer edge portion 212o in FIG. 3, the dimension symbol omitted in the drawings) of the linear portion of the groove bottom portion 212 is preferably in a range of from not less than 40% to not greater than 60% with respect to the wavelength $\lambda 2o\_sh$ of the outer edge portion 212o.

However, no such limitation is intended, and the groove bottom portion 212 in the shoulder main groove 21 may have the wave-like shape as described above (not illustrated).

Groove Wall Structure of Center Main Groove

Figure 6:
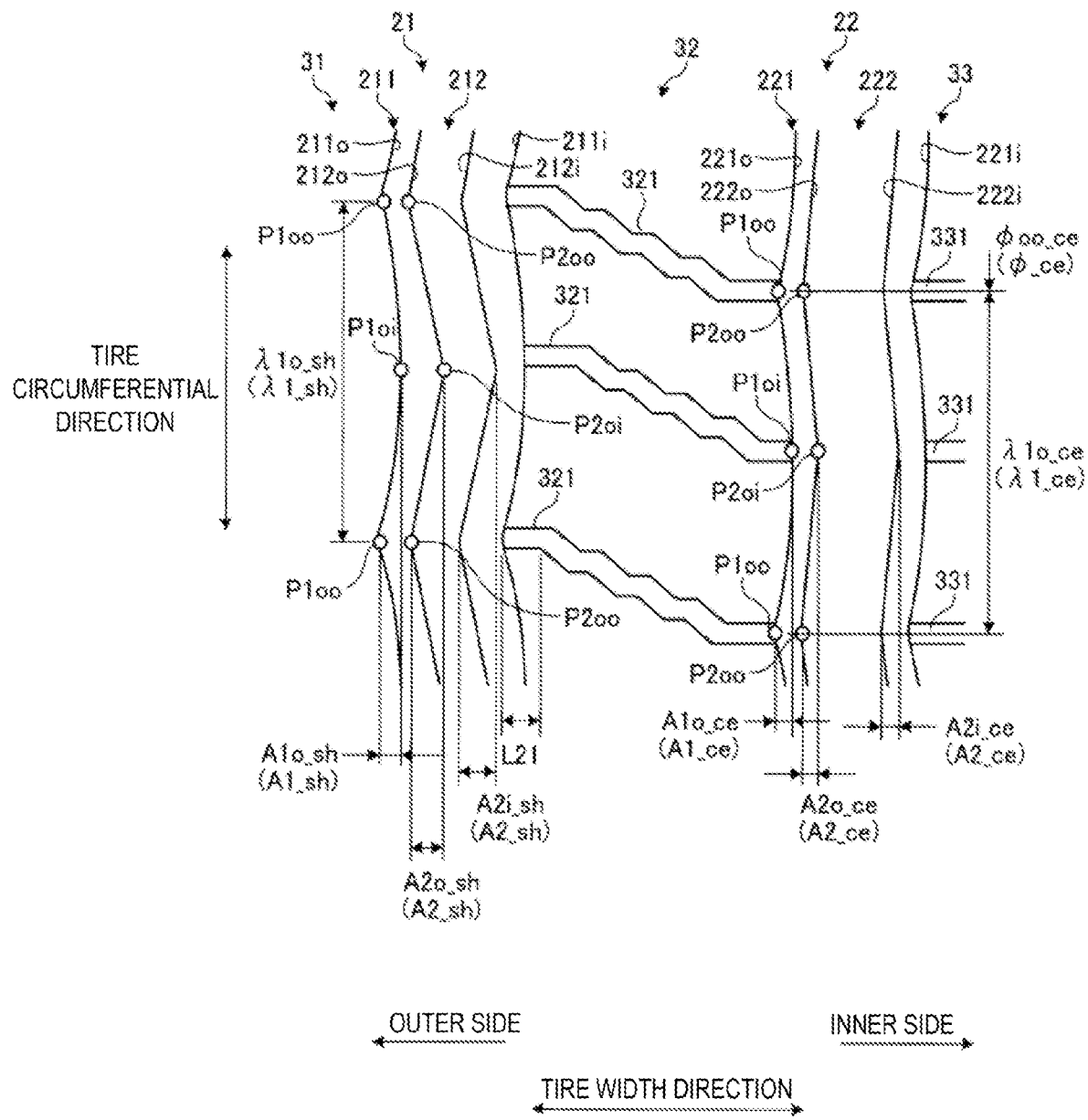
FIG. 6 is an explanatory diagram illustrating groove wall structures of the shoulder main groove and a center main groove illustrated in FIG. 2.

FIG. 6 is an explanatory diagram illustrating the groove wall structures of the shoulder main groove 21 and the center main groove 22 illustrated in FIG. 2.

As illustrated in FIGS. 2 and 6, the groove wall structure of the shoulder main groove 21 slightly differs from the groove wall structure of the center main groove 22. However, the configuration is not limited thereto, and the center main groove 22 may have a groove wall structure identical to the groove wall structure of the shoulder main groove 21. Here, the groove wall structure of the center main groove 22 will be described mainly about differences from the groove wall structure of the shoulder main grooves 21, and description of common points will be omitted.

In the configuration in FIG. 2, as illustrated in FIG. 6, a groove opening portion 221 in the center main groove 22 has a wave-like shape with an amplitude in the tire width direction at respective outer edge portion 221o on the middle land portion 32 side and inner edge portion 221i on the center land portion 33 side. Furthermore, a groove bottom portion 222 in the center main groove 22 has a wave-like shape with an amplitude in the tire width direction at respective outer edge portion 222o on the middle land portion 32 side and inner edge portion 222i on the center land portion 33 side.

As illustrated in FIG. 6, the outer maximum amplitude position P1oo of the outer edge portion 221o of the groove opening portion 221 in the center main groove 22 is at a position in the tire circumferential direction identical to the outer maximum amplitude position P2oo of the outer edge portion 222o of the groove bottom portion 222. Specifically, in FIG. 6, an offset amount φoo_ce between the outer maximum amplitude positions P1oo, P2oo in the outer edge portions 221o, 222o of the groove opening portion 221 and the groove bottom portion 222 in the center main groove 22 has the relationship $0 \leq \varphi oo\_ce/\lambda 1o\_ce \leq 0.10$ with respect to a wavelength $\lambda 1o\_ce$ of the outer edge portion 221o of the groove opening portion 221, and more preferably has the relationship $0 \leq \varphi oo\_ce/\lambda 1o\_ce \leq 0.05$.

In FIG. 6, the wavelength $\lambda 1o\_ce$ of the outer edge portion 221o of the groove opening portion 221 in the center main groove 22 is set to be substantially identical to a wavelength $\lambda 2o\_ce$ (not illustrated) of the outer edge portion 222o of the groove bottom portion 222. Specifically, the wavelengths $\lambda 1o\_ce$, $\lambda 2o\_ce$ of the groove opening portion 221 and the groove bottom portion 222 are in the range $0.90 \leq \lambda 2o\_ce/\lambda 1o\_ce \leq 1.10$.

Furthermore, a wavelength $\lambda 2\_ce$ (the wavelength $\lambda 2o\_ce$ of the outer edge portion 222o and the wavelength $\lambda 2i\_ce$ of the inner edge portion 222i, not illustrated) of the groove bottom portion 222 in the center main groove 22 has the relationship $0.10 \leq \lambda 2\_ce/TW \leq 0.35$ with respect to the tire ground contact width TW.

In addition, in FIG. 6, wavelength $\lambda 1\_ce$ (the wavelength $\lambda 1o\_ce$ of the outer edge portion 221o and a wavelength $\lambda 1i\_ce$ (not illustrated) of the inner edge portion 221i of the groove opening portion 221 in the center main groove 22) are set to be substantially identical to wavelength $\lambda 1\_sh$ (the wavelength $\lambda 1o\_sh$ of the outer edge portion 211o and the wavelength $\lambda 1i\_sh$ (see FIG. 4) of the inner edge portion 211i) of the groove opening portion 211 in the shoulder main groove 21, and specifically have the relationship $0.90 \leq \lambda 1\_ce/\lambda 1\_sh \leq 1.10$.

Additionally, in FIG. 6, an amplitude A1o_ce of the outer edge portion 221o of the groove opening portion 221 in the center main groove 22 has the relationship $1.05 \leq A2o\_ce/A1o\_ce \leq 1.50$ with respect to an amplitude A2o_ce of the outer edge portion 222o of the groove bottom portion 222, and more preferably has the relationship $1.10 \leq A2o\_ce/A1o\_ce \leq 1.20$. Accordingly, the amplitude A2o_ce of the wave-like shape of the groove bottom portion 222 is set to be larger than the amplitude A1o_ce of the wave-like shape of the groove opening portion 221.

Additionally, the amplitudes A1o_ce, A1ice (not illustrated) of the groove opening portion 221 in the center main groove 22 are in a range of from not less than 0 mm to not greater than 10.0 mm and preferably in a range of from not less than 2.0 mm to not greater than 6.0 mm. When the amplitudes A1o_ce, A1i_ce are 0 mm, the groove opening portion 221 in the center main groove 22 has a straight shape.

Additionally, the amplitudes A2o_ce, A2i_ce of the groove bottom portion 222 in the center main groove 22 are in a range of from not less than 1.5 mm to not greater than 13.5 mm, and preferably in a range of from not less than 2.2 mm to not greater than 9.0 mm.

Additionally, in FIG. 6, the amplitudes A1_ce (A1o_ce, A1i_ce) of the left and right edge portions 221o, 221i of the groove opening portion 221 in the center main groove 22 are set to be smaller than the amplitudes A1_sh (A1o_sh, A1i_sh) of the left and right edge portions 211o, 211i of the groove opening portion 211 in the shoulder main groove 21. Specifically, the amplitudes A1_ce of the left and right edge portions 221o, 221i of the groove opening portion 221 in the center main groove 22 have the relationship $A1\_ce/A1\_sh \leq 0.95$ with respect to the amplitudes A1_sh of the left and right edge portions 211o, 211i of the groove opening portion 211 in the shoulder main groove 21, and more preferably have the relationship $A1\_ce/A1\_sh \leq 0.90$. The lower limit of the ratio A1_sh/A1_ce is not particularly limited, but is subject to restrictions by other conditions.

Additionally, in FIG. 6, the amplitudes A2_ce (A2o_ce, A2i_ce) of the left and right edge portions 222o, 222i of the groove bottom portion 222 in the center main groove 22 are set to be smaller than the amplitudes A2_sh (A2o_sh, A2i_sh) of the left and right edge portions 212o, 212i of the groove bottom portion 212 in the shoulder main groove 21. Specifically, the amplitudes A2_ce of the left and right edge portions 222o, 222i of the groove bottom portion 222 in the center main groove 22 have the relationship $A2\_ce/A2\_sh \leq 0.95$ with respect to the amplitudes A2_sh of the left and right edge portions 212o, 212i of the groove bottom portion 212 in the shoulder main groove 21, and more preferably have the relationship $A2\_ce/A2\_sh \leq 0.75$. The lower limit of the ratio A2_ce/A2_sh is not particularly limited, but is subject to restrictions by other conditions.

Also, a maximum width Wg2_ce (dimension symbol omitted in the drawings) of the groove bottom portion 222 in the center main groove 22 has the relationship 0<Wg2_ce/Wg1_ce≤0.80 with respect to a maximum width Wg1_ce of the groove opening portion 221 (that is, the maximum groove width of the center main groove 22, dimension symbol omitted in the drawings), and more preferably has the relationship 0.40≤Wg2_ce/Wg1_ce≤0.60. When the groove bottom portion of the main groove has an arc shape or a funnel shape (not illustrated), the maximum width Wg2_ce of the groove bottom portion 222 becomes substantially 0.

Additionally, in the configuration of FIG. 6, both the outer edge portion 221o and the inner edge portion 221i of the groove opening portion 221 in the center main groove 22 have a wave-like shape formed by connecting a plurality of arcs projecting to the inner side in the tire width direction (that is, the tire equatorial plane CL side, see FIG. 2). Additionally, a circumferential length of the arc (dimension symbol omitted in drawings) is not less than 80% with respect to the wavelength $\lambda 1o\_ce$ of the outer edge portion 221o, and more preferably not less than 85%. Additionally, the adjacent arcs are connected via short straight lines or arcs.

However, no such limitation is intended, and the groove opening portion 221 in the center main groove 22 may have the linear shape or the zigzag shape as described above, or may have a wave-like shape of a sine wave shape (not illustrated).

Middle Land Portion and Center Land Portion

In the configuration of FIG. 2, the middle land portion 32 and the center land portion 33 each include a plurality of through lug grooves 321; 331 and a plurality of blocks 322; 332.

The edge portions of the middle land portion 32 and the center land portion 33 have the wave-like shape formed by connecting the plurality of arcs as described above. The left and right edge portions of the middle land portion 32 have the wave-like shape formed by connecting the plurality of arcs projecting to the tire equatorial plane CL side. On the other hand, the center land portion 33 is disposed on the tire equatorial plane CL, and the left and right edge portions of the center land portion 33 have the wave-like shape formed by connecting the plurality of arcs projecting to the tire equatorial plane CL side, that is, the inner side in the width direction of the center land portion 33. As a result, the edge portions of the land portions 31 to 33 of the entire tread have the wave-like shape formed by connecting the plurality of arcs projecting to the tire equatorial plane CL side.

As illustrated in FIGS. 2 and 6, the through lug grooves 321, 331 in the middle land portion 32 and the center land portion 33 open to the maximum amplitude positions of the edge portions of the land portions 32, 33. A pitch number of the through lug grooves 321, 331 is set to be twice a pitch number of the wave-like shapes of the edge portions in the land portions 32, 33. Additionally, the pitch number of the through lug grooves 321, 331 in the entire circumference of the tire is in a range of from not less than 110 to not greater than 200. Additionally, the wave-like shapes of the left and right edge portions in the middle land portion 32 and the center land portion 33 are disposed with phases shifted in the tire circumferential direction. Accordingly, the through lug grooves 321, 331 extend to be inclined with respect to the tire width direction.

As illustrated in FIG. 6, the through lug grooves 321, 331 have short linear portions parallel to the tire width direction at opening end portions to the main grooves 21, 22. An extension length L21 of these linear portions is preferably in a range of from not less than 5% to not greater than 25% of the ground contact widths Wb2, Wb3 (see FIG. 2) of the land portions 31, 32.

The through lug grooves 321 (331) in the middle land portion 32 (and the center land portion 33) are narrow shallow grooves, and have a maximum groove width W21 (see FIG. 3) of not less than 1.5 mm and not greater than 4.0 mm (see FIG. 3) and a maximum groove depth H21 (see FIG. 5) of not less than 1.0 mm and not greater than 6.0 mm. In addition, in FIG. 5, the maximum groove depth H21 of the through lug groove 321 (331) has the relationship 0.05≤H21/Hg1≤0.65 with respect to a maximum groove depth Hg1 of the shoulder main groove 21, and more preferably has the relationship 0.10≤H21/Hg1≤0.30.

The blocks 322; 332 are defined by the plurality of through lug grooves 321; 331. The blocks 322, 332 have a shape that is long in the tire width direction. Specifically, pitch lengths of the blocks 322; 332 (The pitch length of the blocks 322 in the middle land portion 32 is equal to the maximum distance L1i_sh in the tire circumferential direction between the outer maximum amplitude position P1io and the inner maximum amplitude position P1ii in the inner edge portion 211i of the groove opening portion 211 in the shoulder main groove 21 in FIG. 4. The dimension symbol is omitted in drawings regarding the pitch length of the blocks 332 in the center land portion 33.) are in a range of from not less than 40% to not greater than 70% to the maximum ground contact widths Wb2; Wb3 of the land portions 32; 33, and preferably in a range of from not less than 50% to not greater than 60%.

A snow traction index STI (so-called 0 degrees snow traction index) with respect to the tire circumferential direction throughout the entire circumference of the tire is in the range 130≤STI.

The snow traction index STI is an empirical formula by Uniroyal Inc. proposed by the Society of Automotive Engineers (SAE) and is defined by the following Mathematical Formula (1). In the Formula, Pg is a groove density (1/mm) and is calculated as a ratio between the groove length (mm) of all the grooves (all grooves except sipes) projected in the tire circumferential direction on the tire ground contact surface and the tire ground contact area (product of the tire ground contact width and tire circumferential length) (mm^2). In addition, ρs is a sipe density (1/mm) and is calculated as a ratio between a sipe length (mm) of all the sipes projected in the tire circumferential direction on the tire ground contact surface and a tire ground contact area (mm^2). Furthermore, Dg is an average value of the groove depth (mm) of all the grooves projected in the tire circumferential direction on the tire ground contact surface.

$$STI=-6.8+2202\times Pg+672\times \rho s+7.6\times Dg \qquad (1)$$

Shoulder Land Portion

Figure 7:
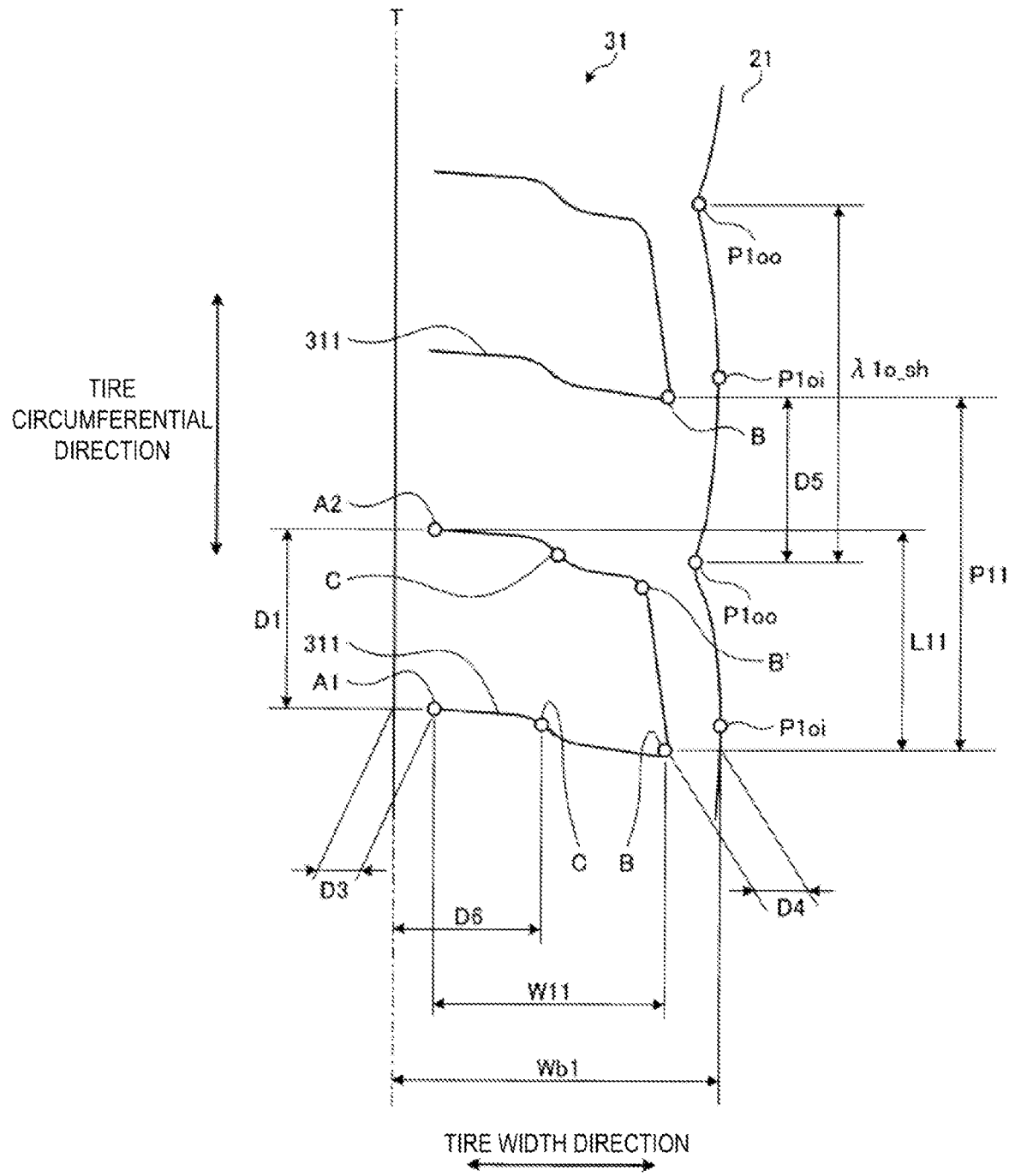
FIG. 7 is an enlarged view illustrating a shoulder land portion of the tire illustrated in FIG. 2.
Figure 8:
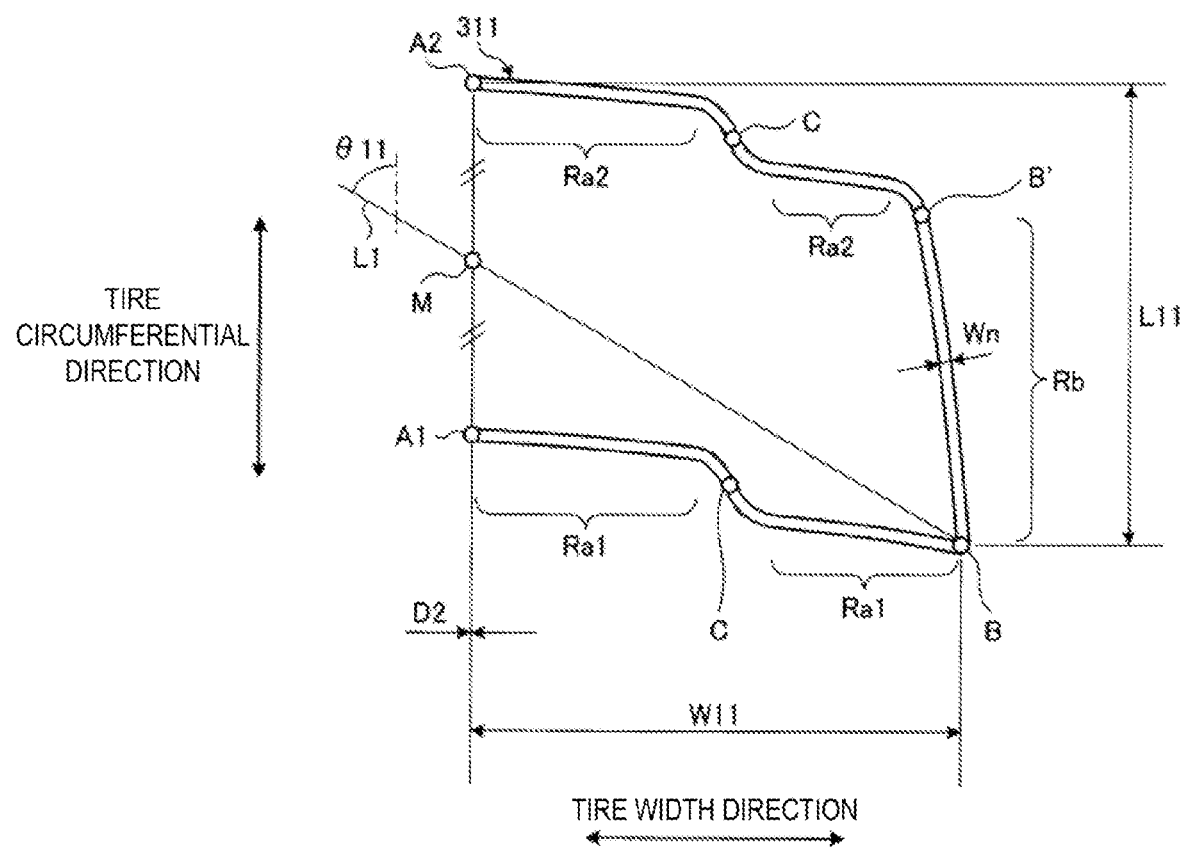
FIG. 8 is an enlarged view illustrating a narrow shallow groove of the shoulder land portion illustrated in FIG. 7.
Figure 9:
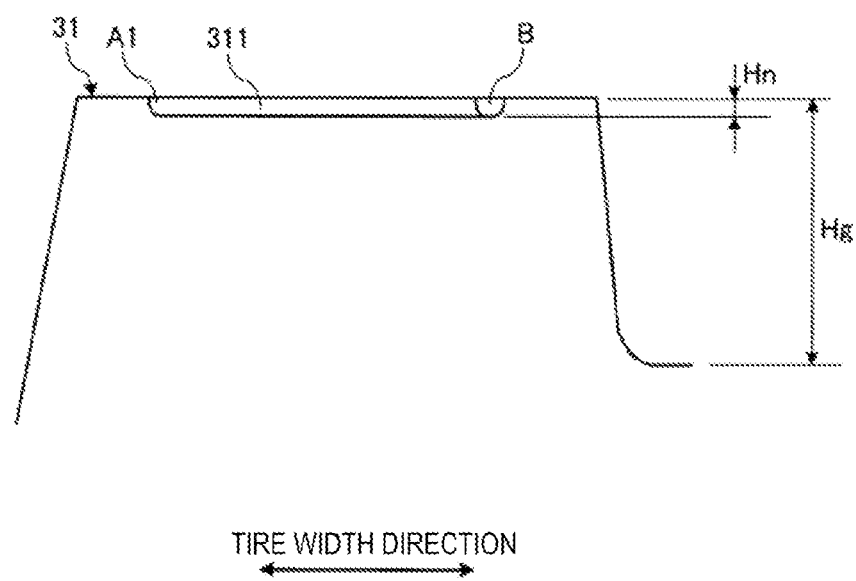
FIG. 9 is a cross-sectional view of the shoulder land portion illustrated in FIG. 7.

FIG. 7 is an enlarged view illustrating the shoulder land portion 31 of the tire 1 illustrated in FIG. 2. FIG. 8 is an enlarged view illustrating the narrow shallow groove 311 in the shoulder land portion 31 illustrated in FIG. 7. The identical drawing illustrates the extracted single narrow shallow groove 311. FIG. 9 is a cross-sectional view of the shoulder land portion 31 illustrated in FIG. 7. The identical drawing illustrates the cross-sectional view of the shoulder land portion 31 cut along the narrow shallow groove 311.

In the configuration of FIG. 2, as described above, the shoulder land portion 31 is the rib having the continuous road contact surface in the tire circumferential direction, and is not divided in the tire circumferential direction by lug grooves or sipes. Additionally, the edge portion on the shoulder main groove 21 side of the shoulder land portion 31 has the wave-like shape formed by connecting the plurality of arcs projecting to the tire equatorial plane CL side.

As illustrated in FIG. 2, the shoulder land portion 31 includes the plurality of narrow shallow grooves 311.

The narrow shallow groove 311 has a U-shape (or a V-shape or a C-shape) having an opening portion facing the tire ground contact edge T side. In other words, the narrow shallow grooves 311 have closed portions on the tire equatorial plane CL side, and have a unilateral opening shape with a continuous opening on the tire ground contact edge T side. Additionally, the narrow shallow grooves 311 have a closed structure in which the narrow shallow grooves 311 terminate within the ground contact surface of the shoulder land portion 31. Thus, the narrow shallow grooves 311 are not connected to the tire ground contact edge T or the shoulder main groove 21, and are disposed separated from the edge portion of the road contact surface of the shoulder land portion 31. Additionally, the plurality of narrow shallow grooves 311 are disposed at a predetermined interval in the tire circumferential direction. The adjacent narrow shallow grooves 311 are disposed to be mutually separated.

A maximum groove width Wn (see FIG. 8) of the narrow shallow groove 311 is preferably in the range 0.1 mm≤Wn≤5.0 mm, and in the range 0.3 mm≤Wn≤2.0 mm. Additionally, a maximum groove depth Hn (see FIG. 9) of the narrow shallow groove 311 has the relationship 0.01≤Hn/Hg≤0.30 with respect to the maximum groove depth Hg of the shoulder main groove 21, and preferably has the relationship 0.03≤Hn/Hg≤0.25. By having the maximum groove width Wn and the maximum groove depth Hn described above, the narrow shallow grooves 311 function as grooves that open and do not close when the tire comes into contact with the ground.

In the configuration described above, (1) the narrow shallow grooves 311 have the U-shape. This improves the acceleration performance on snow of the tire during vehicle traveling by circumferential components of the narrow shallow grooves 311, compared to a configuration (not illustrated) including a plurality of width direction narrow grooves having an I shape disposed in the tire circumferential direction. Additionally, (2) since the narrow shallow groove 311 has the U-shape with the opening portion facing the tire ground contact edge T side, the circumferential components of the narrow shallow grooves in a region on the tire ground contact edge T side can be omitted compared to a configuration (not illustrated) that includes narrow shallow grooves having, for example, an annular structure. This improves noise performance of the tire during vehicle traveling and suppresses the uneven wear originating from the narrow shallow groove 311. Additionally, (3) since the narrow shallow grooves 311 have the closed structure in which the narrow shallow grooves 311 terminate within the ground contact surface of the land portion 31, the noise performance of the tire is improved compared to a configuration (not illustrated) that includes narrow shallow grooves penetrating the ground contact surface of the land portion in the tire width direction or the tire circumferential direction.

In FIG. 7, a width direction length W11 of the narrow shallow groove 311 has the relationship 0.40≤W11/Wb1≤0.90 with respect to the maximum ground contact width Wb1 of the shoulder land portion 31, and preferably has the relationship 0.50≤W11/Wb1≤0.80.

The width direction length W11 of the narrow shallow groove 311 is measured as the maximum extension length of the narrow shallow groove 311 in the tire width direction when the tire is mounted on a specified rim, inflated to the specified internal pressure, and in an unloaded state.

Additionally, in FIG. 7, a circumferential length L11 of the narrow shallow groove 311 has the relationship 0.50≤L11/P11≤0.90 with respect to a pitch length P11 of the narrow shallow grooves 311, and preferably has the relationship 0.60≤L11/P11≤0.80.

The circumferential length L11 of the narrow shallow groove 311 is measured as the maximum extension length of the narrow shallow groove 311 in the tire circumferential direction when the tire is mounted on a specified rim, inflated to the specified internal pressure, and in an unloaded state.

A pitch number Pn of the narrow shallow grooves 311 is identical to a pitch number of the wave-like shapes of the edge portions in the shoulder land portion 31, and is in a range of from not less than 50 to not greater than 100. In addition, a distance (not illustrated) between the adjacent narrow shallow grooves 311, 311 is preferably ensured in a range of not less than 10 mm.

In FIG. 7, a distance D1 between terminating end points A1, A2 of the narrow shallow groove 311 in the tire circumferential direction has the relationship 0.30≤D1/P11≤0.70 with respect to the pitch length P11 of the narrow shallow grooves 311, and preferably has the relationship 0.40≤D1/P11≤0.60.

In FIG. 7, a distance D2 (see FIG. 8) between the terminating end points A1, A2 of the narrow shallow groove 311 in the tire width direction has the relationship 0≤D2/Wb1≤0.70 with respect to the maximum ground contact width Wb1 of the shoulder land portion 31, and preferably has the relationship 0≤D2/Wb1≤0.50.

In FIG. 7, a distance D3 between the narrow shallow groove 311 and the tire ground contact edge T has the relationship 0.05≤D3/Wb1 with respect to the maximum ground contact width Wb1 of the shoulder land portion 31, and preferably has the relationship 0.10≤D3/Wb1. Similarly, a distance D4 between the narrow shallow groove 311 and the edge portion of the shoulder land portion 31 has the relationship 0.10≤D4/Wb1 with respect to the maximum ground contact width Wb1 of the shoulder land portion 31, and preferably has the relationship 0.15≤D4/Wb1. This ensures the rigidity of the edge portion of the shoulder land portion 31. Note that the upper limits of the distances D3, D4 are not particularly limited, but are subject to restrictions by the relationship with the ratio W11/Wb1 of the width direction length W11 of the narrow shallow groove 311 described above. In the configuration of FIG. 7, the measurement point of the distance D3 is the terminating end point A1, but the other terminating end point A2 can be the measurement point of the distance D3 depending on the shape of the narrow shallow groove 311.

In FIG. 7, the width direction length W11 and the circumferential length L11 of the narrow shallow groove 311 have the relationship 0.60≤W11/L11≤1.40, and preferably have the relationship 0.80≤W11/L11≤1.20.

In FIG. 7, as described above, in the configuration in which the shoulder land portion 31 includes the edge portion having the zigzag shape or the wave-like shape with the amplitude in the tire width direction, a distance D5 in the tire circumferential direction between an innermost point B in the tire width direction of the narrow shallow groove 311 and the maximum amplitude position P1oo to the outer side in the tire width direction of the edge portion of the shoulder land portion 31 is in the range 0.30≤D5/λ1o_sh≤0.70 with respect to the wavelength λ1o_sh of the edge portion, and preferably in the range 0.45≤D5/λ1o_sh≤0.65. Accordingly, the innermost point B of the narrow shallow groove 311 is disposed separated from the maximum amplitude position P1oo to the outer side in the tire width direction of the edge portion of the shoulder land portion 31. This ensures the rigidity of the edge portion of the shoulder land portion 31.

As illustrated in FIG. 8, a pair of the terminating end points A1, A2 and the innermost point B in the tire width direction of the narrow shallow groove 311 are defined. An imaginary line L1 that passes through a midpoint M of the terminating end points A1, A2 and the innermost point B is defined. At this time, an angle θ11 formed by the imaginary line L1 and the tire circumferential direction is in the range 45 degrees≤θ11≤135 degrees, and preferably in the range 50 degrees≤θ11≤70 degrees. As a result, the opening directions of the U-shapes of the narrow shallow grooves 311 are made appropriate.

In the configuration of FIG. 8, the U-shape of the narrow shallow groove 311 has continuous width direction extending portions Ra1, Ra2 having inclination angles of not less than 75 degrees and not greater than 105 degrees with respect to the tire circumferential direction. A sum total ΣLa of width direction lengths La1 to La4 (dimension symbols omitted in the drawings) of the width direction extending portions Ra1, Ra2 has the relationship 1.00≤ΣLa/W11 with respect to the width direction length W11 of the narrow shallow groove 311, and preferably has the relationship 1.30≤ΣLa/W11. The width direction lengths La1 to La4 of the width direction extending portions Ra1, Ra2 are each preferably within a range of not less than 25% to the width direction length W11 of the narrow shallow groove 311. As a result, the width direction lengths La1 to La4 of the width direction extending portions Ra1, Ra2 are ensured. The upper limit of the ratio is not particularly limited, but is subject to restrictions by other conditions.

The inclination angle of the U-shape of the narrow shallow groove 311 is measured as an angle formed by a tangent line of the groove center line of the narrow shallow groove and the tire circumferential direction.

In the configuration of FIG. 8, the U-shape of the narrow shallow groove 311 includes a continuous circumferential extending portion Rb having an inclination angle of not less than 0 degrees and not greater than 15 degrees with respect to the tire circumferential direction. A circumferential length Lb1 (dimension symbol omitted in the drawings) of the circumferential extending portion Rb has the relationship 0.50≤Lb/L11 with respect to the circumferential length L11 of the narrow shallow groove 311, and preferably has the relationship 0.70≤Lb/L11. As a result, the circumferential length Lb1 of the circumferential extending portion Rb is ensured. The upper limit of the ratio is not particularly limited, but is subject to restrictions by other conditions.

As illustrated in FIG. 8, the U-shape of the narrow shallow groove 311 preferably includes a bent portion (reference sign omitted in the drawings) disposed in at least one of regions between the points A1, B and the points A2, B, to connect the adjacent width direction extending portions Ra1, Ra1; Ra2, Ra2. The bent portion has a crank-like shape or an S-shape. A distance D6 from the tire ground contact edge T to a center point C of the bent portion preferably has the relationship 0.30≤D6/Wb1≤0.70 with respect to the maximum ground contact width Wb1 of the shoulder land portion 31, and more preferably has the relationship 0.40≤D6/Wb1≤0.60. Thus, the bent portion of the narrow shallow groove 311 is disposed at the center portion in the width direction of the shoulder land portion 31.

For example, in the configuration of FIG. 8, the pair of terminating end points A1, A2 of the narrow shallow groove 311 are disposed at a substantially identical position in the tire width direction. The narrow shallow groove 311 has the single innermost point B. The narrow shallow groove 311 includes the pair of width direction extending portions Ra1, Ra1; Ra2, Ra2 extending substantially parallel to the tire width direction between the points A1, B and between points A2, B', respectively. The two sets of the width direction extending portions Ra1, Ra1; Ra2, Ra2 are each mutually connected via the bent portion having the S-shape. As a result, a groove portion extending in a stepped shape in the tire width direction is formed. Additionally, the bent portions are inclined or bent in the identical direction with respect to the tire circumferential direction. The narrow shallow groove 311 includes the single circumferential extending portion Rb that extends substantially parallel to the tire circumferential direction from the innermost point B. The circumferential extending portion Rb has a straight line or a gentle arc shape projecting toward the tire equatorial plane CL side, and is connected in a substantially L-shape to the width direction extending portions Ra1, Ra2 at the innermost point B and the other end point B'. The pair of terminating end points A1, A2 and both of the end points B, B' of the circumferential extending portion Rb are disposed to be offset from one another in the tire circumferential direction.

In the configuration of FIG. 8, the U-shape of the narrow shallow groove 311 is constituted by a single line not having a branch portion. However, no such limitation is intended, and the U-shape of the narrow shallow groove 311 may have a branch portion that branches from its midway (not illustrated).

Note that the edge portion on the shoulder main groove 21 side of the shoulder land portion 31 may have a plurality of fine multi-sipes (reference sign omitted in the drawings). These multi-sipes have a width of less than 1.0 mm and an extension length of less than 5.0 mm. The multi-sipes suppress the uneven wear of the edge portion of the shoulder land portion 31.

MODIFIED EXAMPLES

FIGS. 10 to 19 are explanatory diagrams illustrating modified examples of the narrow shallow groove 311 illustrated in FIG. 8. In these drawings, constituents that are identical to constituents illustrated in FIG. 8 have the identical reference signs, and explanations thereof are omitted.

In the configuration of FIG. 8, the circumferential extending portion Rb has the straight line or the gentle arc shape inclined with respect to the tire circumferential direction, so that the narrow shallow groove 311 has the single innermost point B'. Furthermore, the innermost point B' is located at the connection portion between the width direction extending portion Ra1 and the circumferential extending portion Rb of the narrow shallow groove 311.

Figure 10:
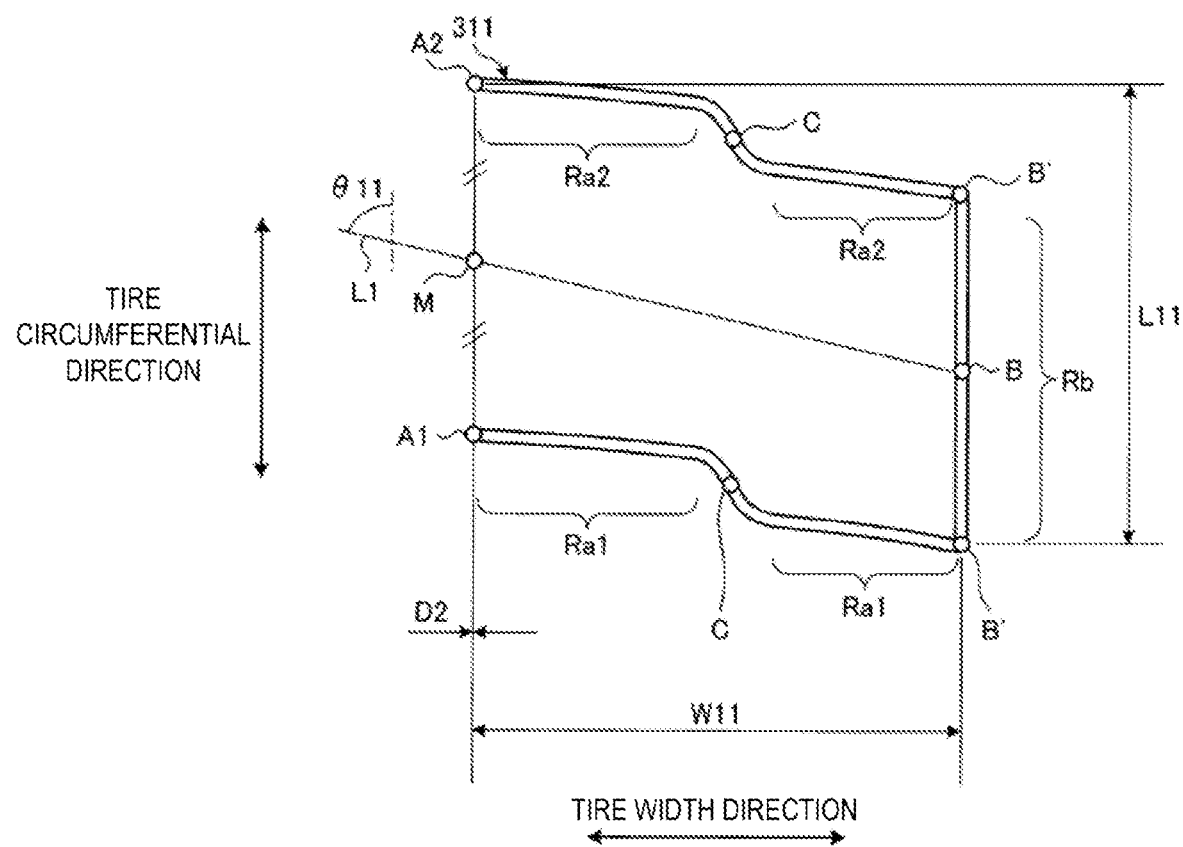
FIG. 10 is an explanatory diagram illustrating a modified example of the narrow shallow groove illustrated in FIG. 8.
Figure 11:
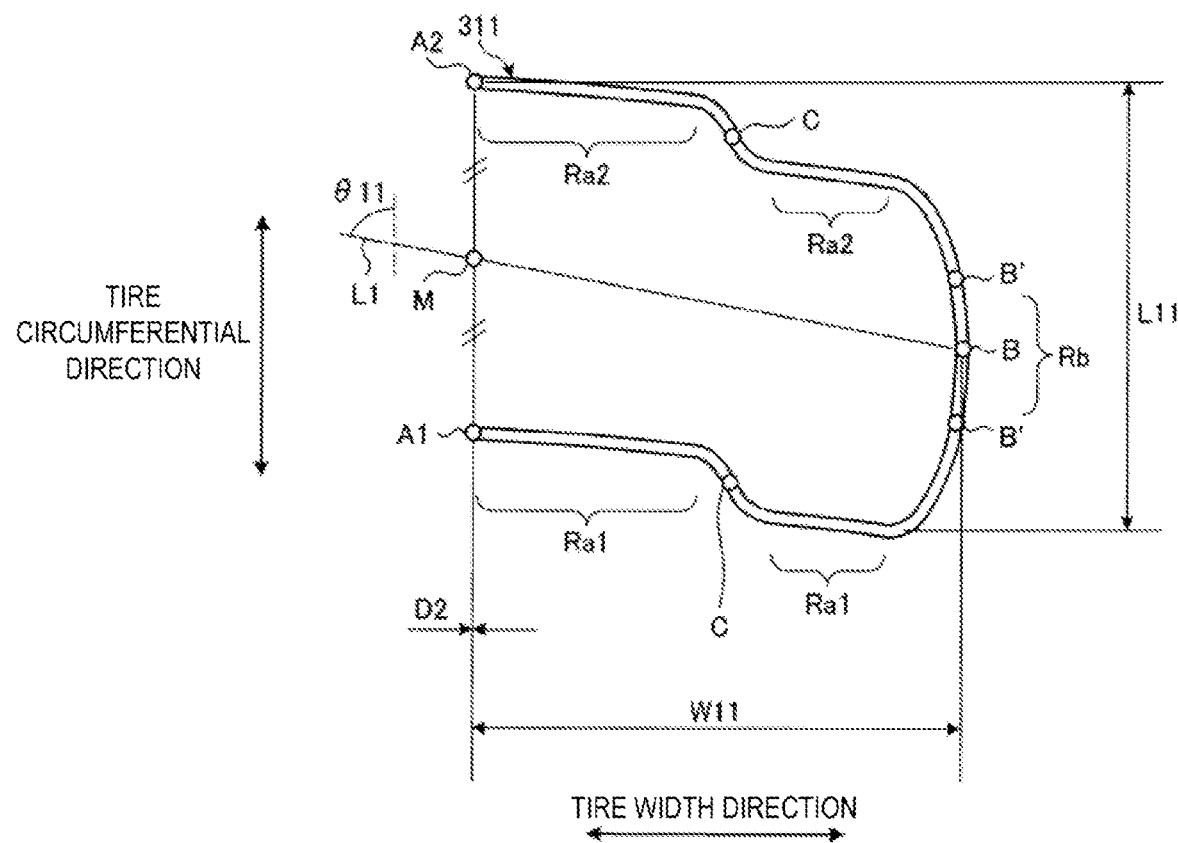
FIG. 11 is an explanatory diagram illustrating a modified example of the narrow shallow groove illustrated in FIG. 8.

In contrast, in the configuration illustrated in FIG. 10, the circumferential extending portion Rb is formed by a straight line parallel to the tire circumferential direction. In this case, a center point of a region (the entire circumferential extending portion Rb in FIG. 10) on the innermost side in the tire width direction among the groove portions of the narrow shallow groove 311 is defined as the innermost point B' of the narrow shallow groove 311. In the configuration of FIG. 11, the left and right width direction extending portions Ra1, Ra2 are connected via groove portions having an arc shape projecting toward the tire equatorial plane CL side. The protrusion portion having the arc shape has the innermost points B' of the narrow shallow groove 311 and the circumferential extending portion Rb.

In the configuration of FIG. 8, the narrow shallow groove 311 includes the pair of width direction extending portions Ra1, Ra1; Ra2, Ra2 extending substantially parallel to the tire width direction between the points A1, B and between points A2, B', respectively.

Figure 12:
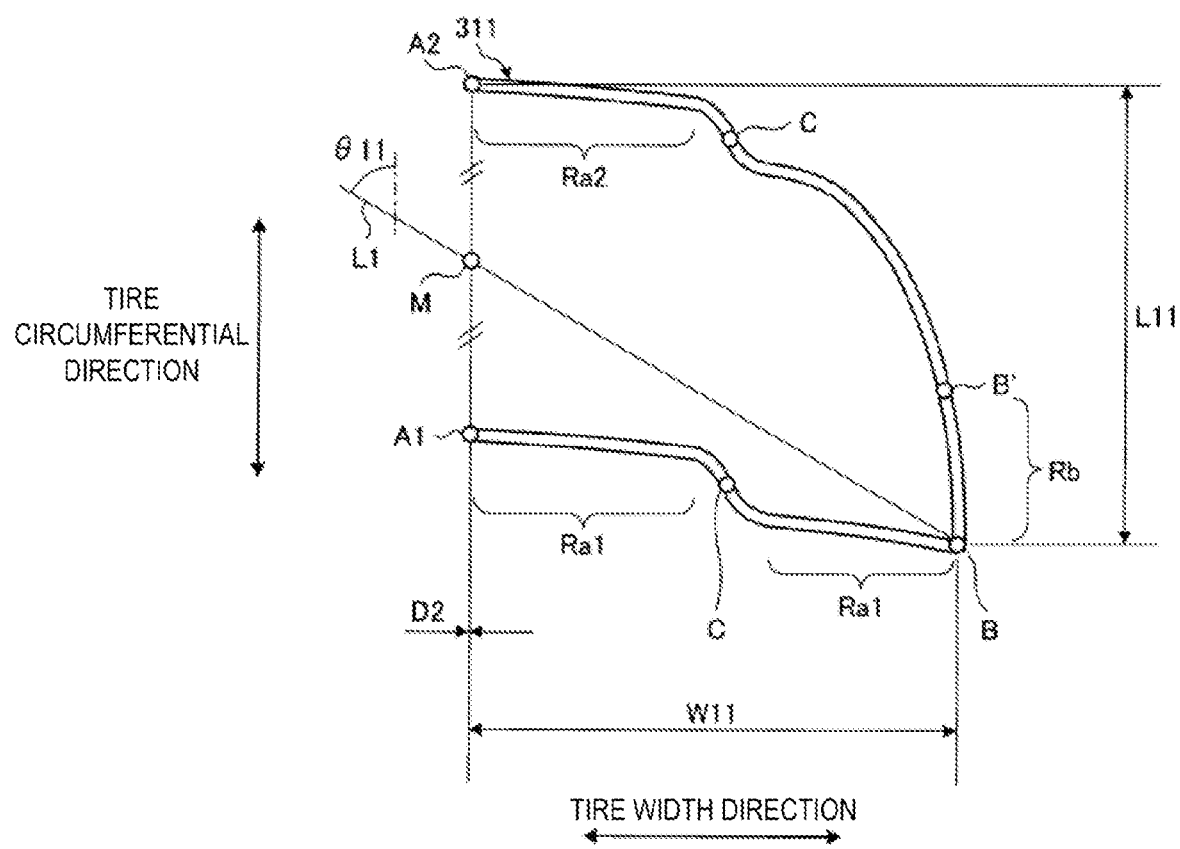
FIG. 12 is an explanatory diagram illustrating a modified example of the narrow shallow groove illustrated in FIG. 8.

In contrast, in the configuration of FIG. 12, the narrow shallow groove 311 includes the pair of width direction extending portions Ra1, Ra1 between the points A1, B, and the single width direction extending portion Ra2 between the points A2, B. Additionally, the width direction extending portion Ra2 on the point A2 side and the innermost point B are connected via a long arc including a short bent portion having an S-shape and the circumferential extending portion Rb.

In the configuration of FIG. 8, the pair of terminating end points A1, A2 of the narrow shallow groove 311 are disposed at the substantially identical position in the tire width direction. Thus, the distance D2 between the terminating end points A1, A2 in the tire width direction is substantially zero.

Figure 13:
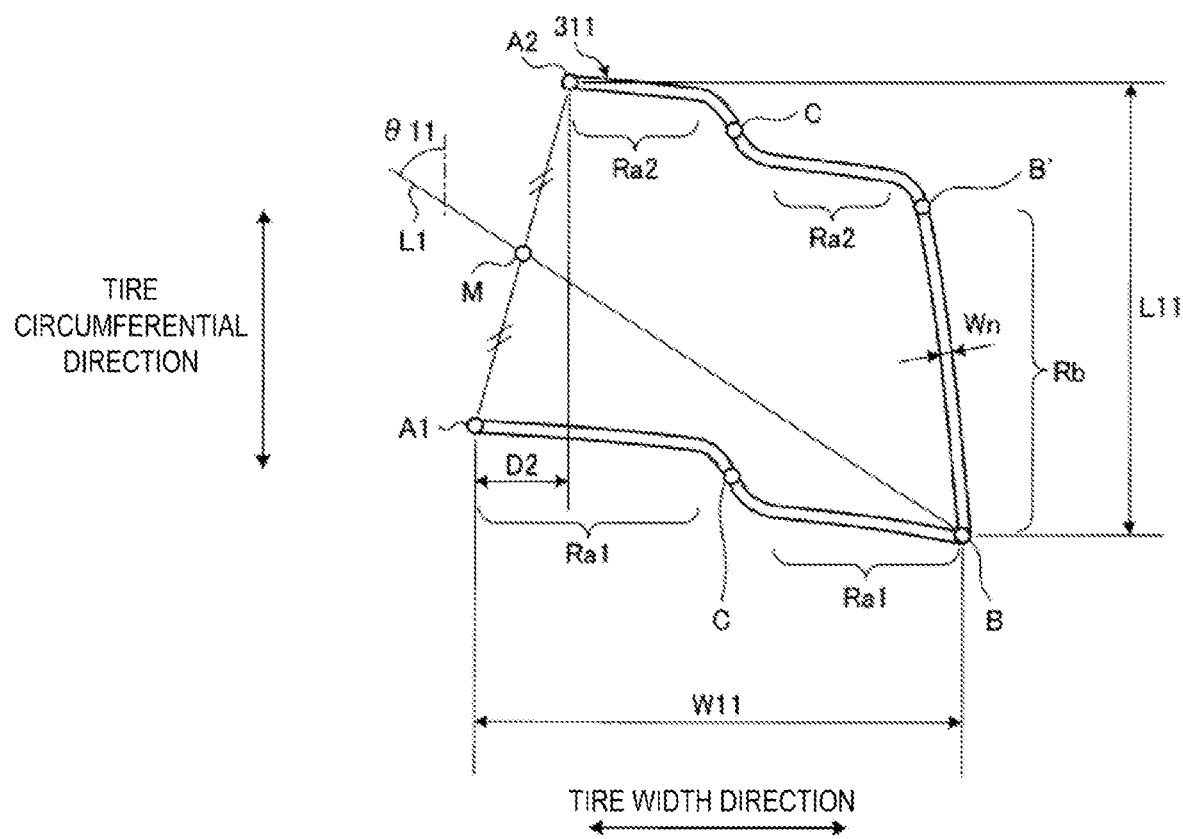
FIG. 13 is an explanatory diagram illustrating a modified example of the narrow shallow groove illustrated in FIG. 8.

In contrast, in the configuration of FIG. 13, the pair of terminating end points A1, A2 of the narrow shallow groove 311 are disposed to be offset from one another in the tire width direction. Even in such a configuration, it is deemed that the opening portion of the narrow shallow groove 311 faces the tire ground contact edge T side as long as the angle θ11 of the narrow shallow groove 311 is within the range described above.

In the configuration of FIG. 8, the opening portion of the U-shape of the narrow shallow groove 311 is configured by the width direction extending portions Ra1, Ra2 having the straight line or the gentle arc shape, and these width direction extending portions Ra1, Ra2 have the terminating end points A1, A2 of the narrow shallow groove 311.

Figure 14:
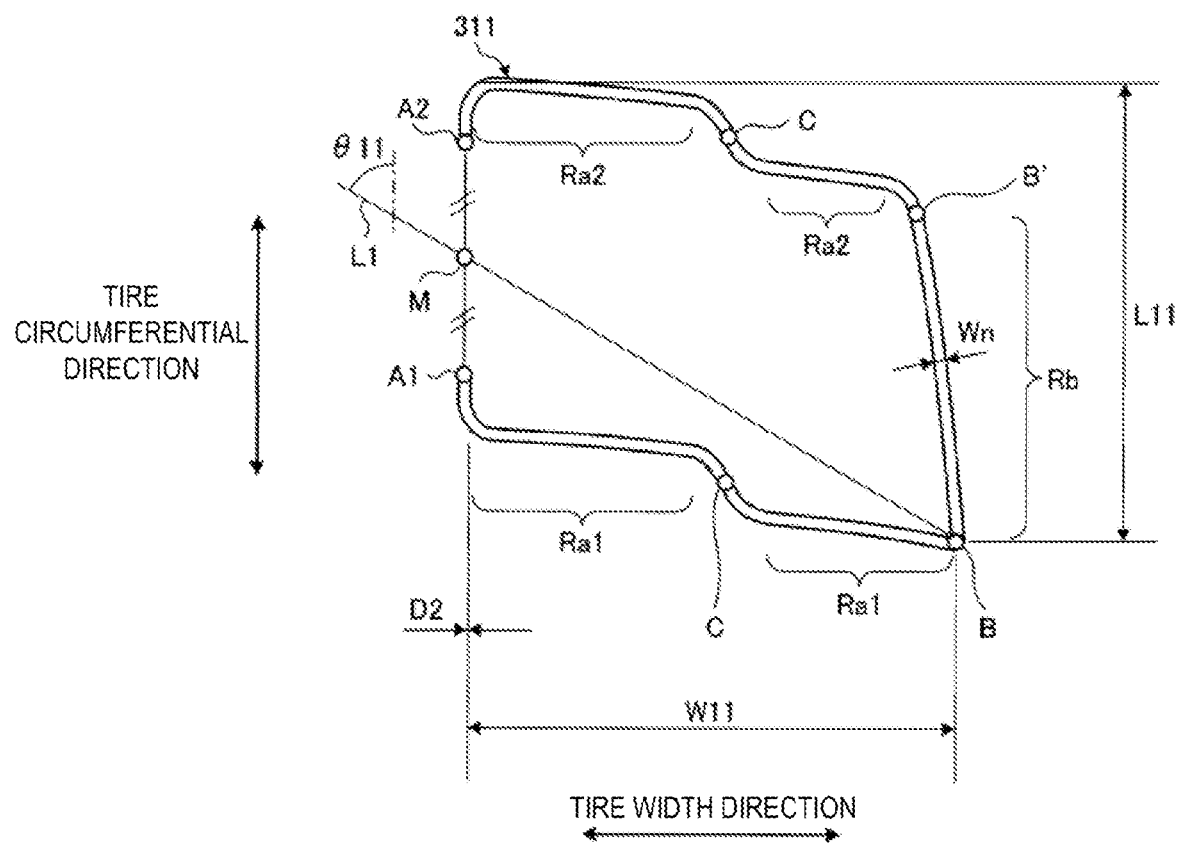
FIG. 14 is an explanatory diagram illustrating a modified example of the narrow shallow groove illustrated in FIG. 8.
Figure 15:
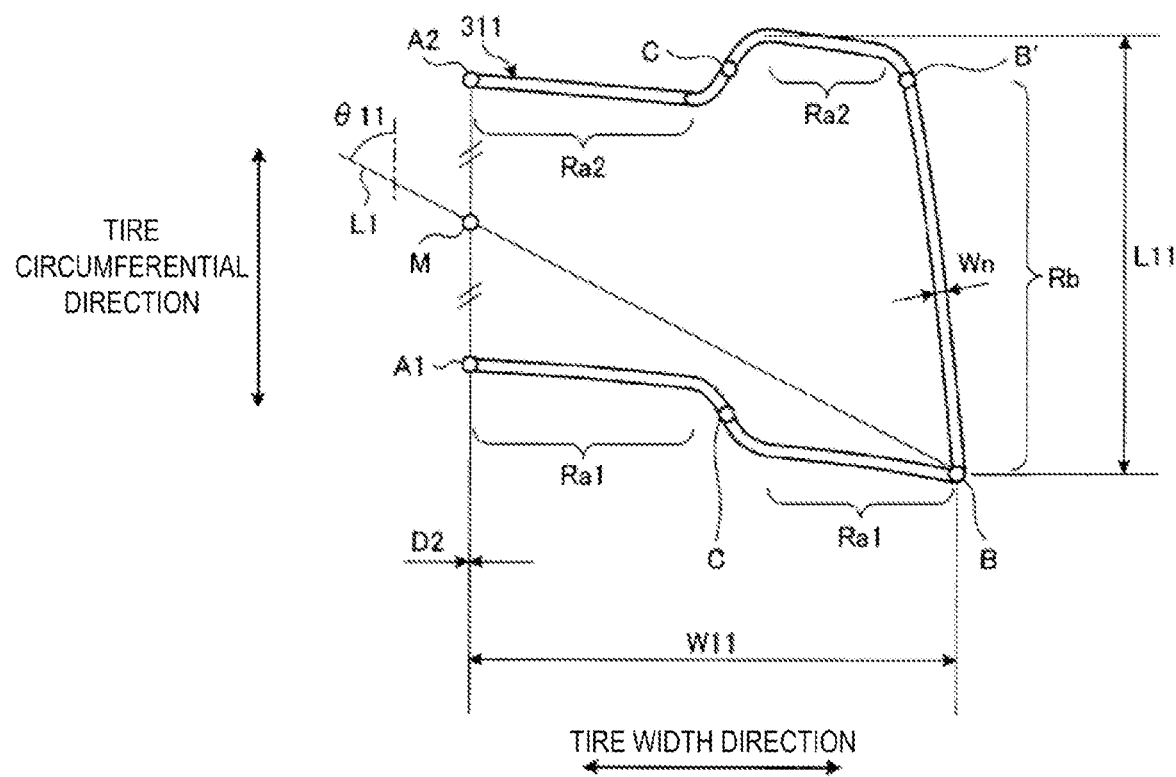
FIG. 15 is an explanatory diagram illustrating a modified example of the narrow shallow groove illustrated in FIG. 8.

In contrast, in the configuration of FIG. 14, the opening portion of the U-shape of the narrow shallow groove 311 is curved in a direction that narrows the opening width to the terminating end points A1, A2. Additionally, in the configuration of FIG. 15, bent portions having an S-shape connecting the adjacent width direction extending portions Ra1, Ra1; Ra2, and Ra2 are curved in a direction that narrows the opening width of the U-shape. Thus, the U-shape of the narrow shallow groove 311 may have a shape with the narrow opening width.

In the configuration of FIG. 8, the narrow shallow groove 311 includes the pair of width direction extending portions Ra1, Ra1; Ra2, Ra2 that extend substantially parallel to the tire width direction between the points A1, B and between the points A2, B, respectively, and the two sets of the respective width direction extending portions Ra1, Ra1; Ra2, Ra2 are connected to one another via the bent portions having the S-shape.

Figure 16:
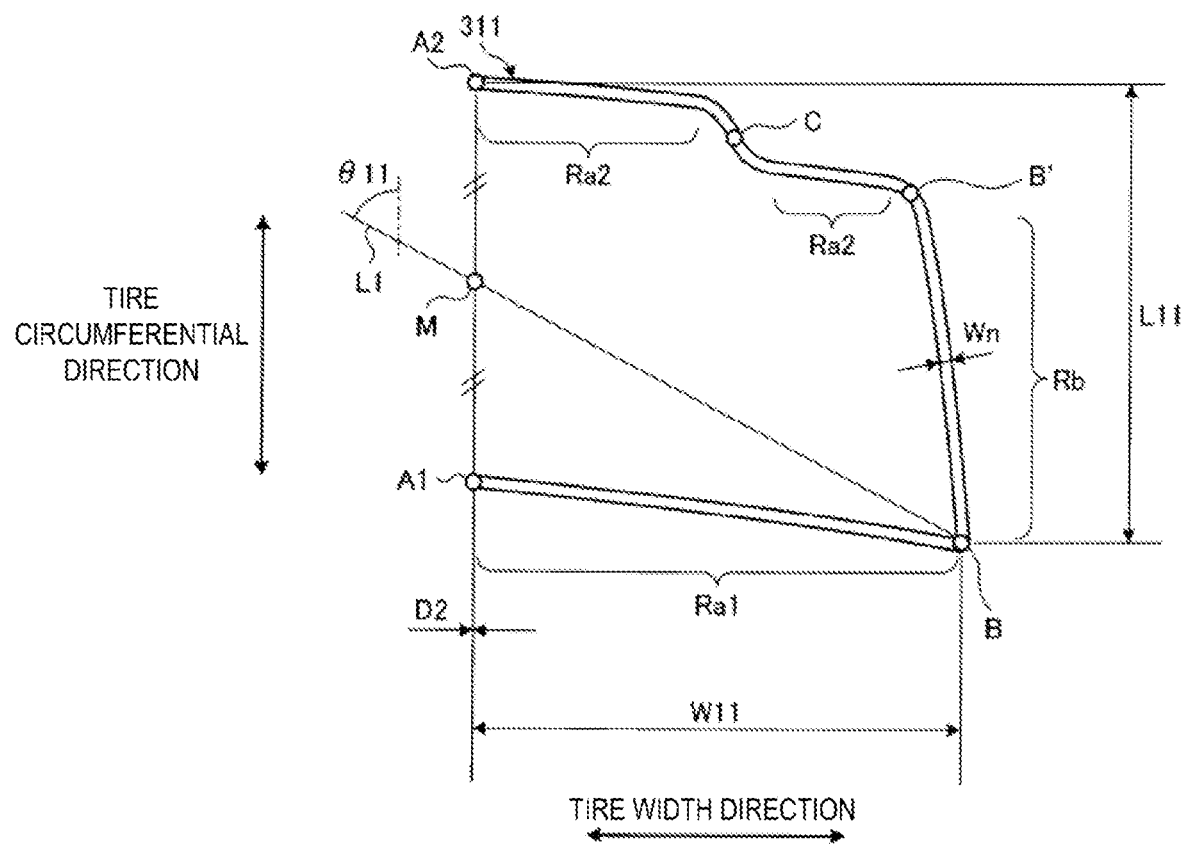
FIG. 16 is an explanatory diagram illustrating a modified example of the narrow shallow groove illustrated in FIG. 8.
Figure 17:
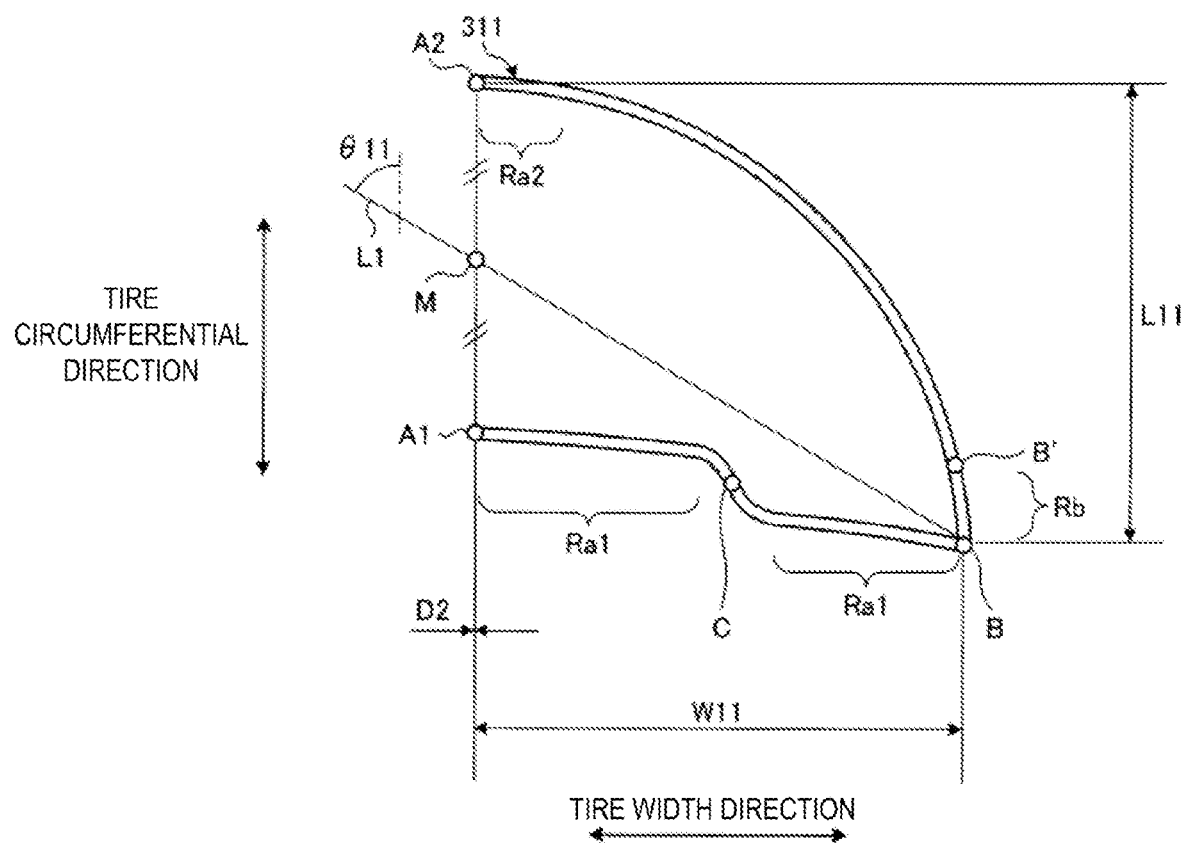
FIG. 17 is an explanatory diagram illustrating a modified example of the narrow shallow groove illustrated in FIG. 8.

In contrast, in the configuration of FIG. 16, the narrow shallow groove 311 includes the single width direction extension portion Ra1 between the points A1, B and includes the pair of width direction extending portions Ra2, Ra2 between the points A2, B. Furthermore, the points A1, B are connected with the long and linear width direction extension portion Ra1. In the configuration of FIG. 17, the pair of the width direction extension portions Ra1, Ra1 are provided between the points A1, B and a width direction extension portion is not provided between the points A2, B. The points A2, B are connected with a long arcuate groove portion.

Figure 18:
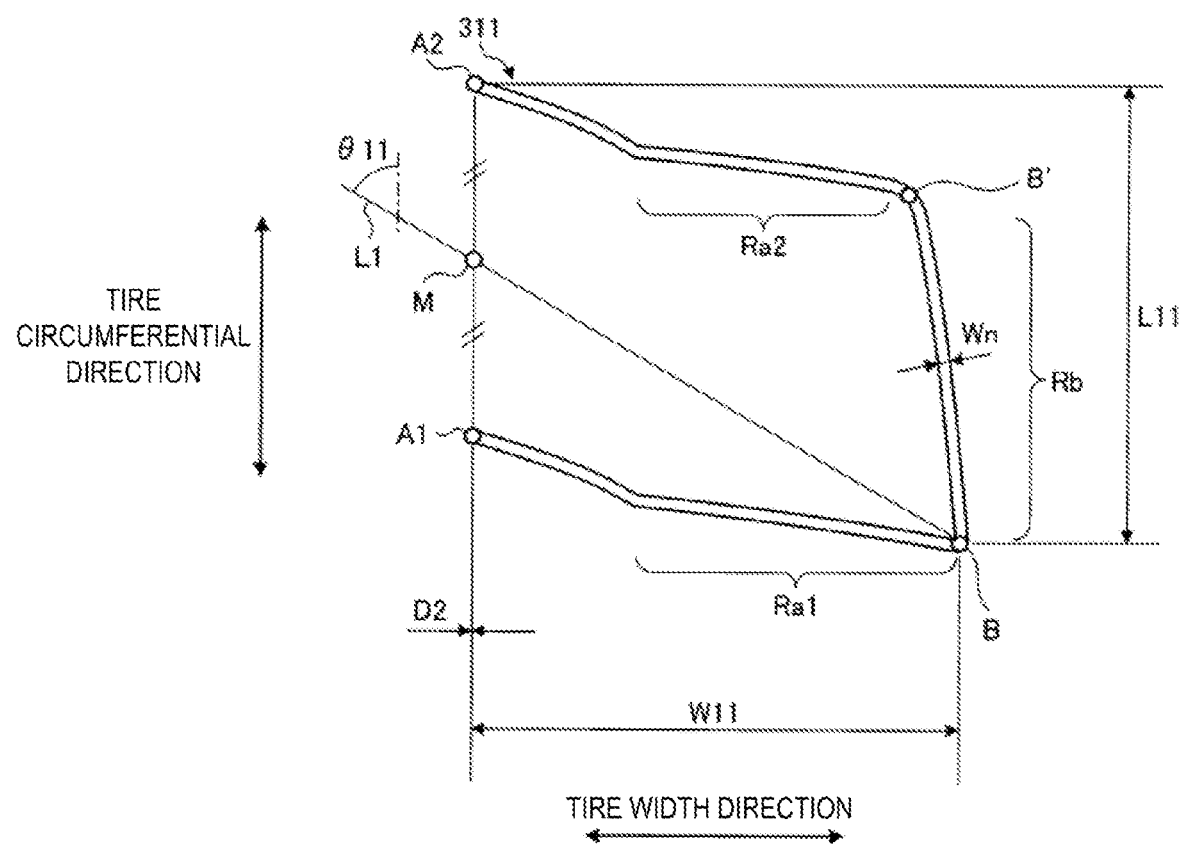
FIG. 18 is an explanatory diagram illustrating a modified example of the narrow shallow groove illustrated in FIG. 8.
Figure 19:
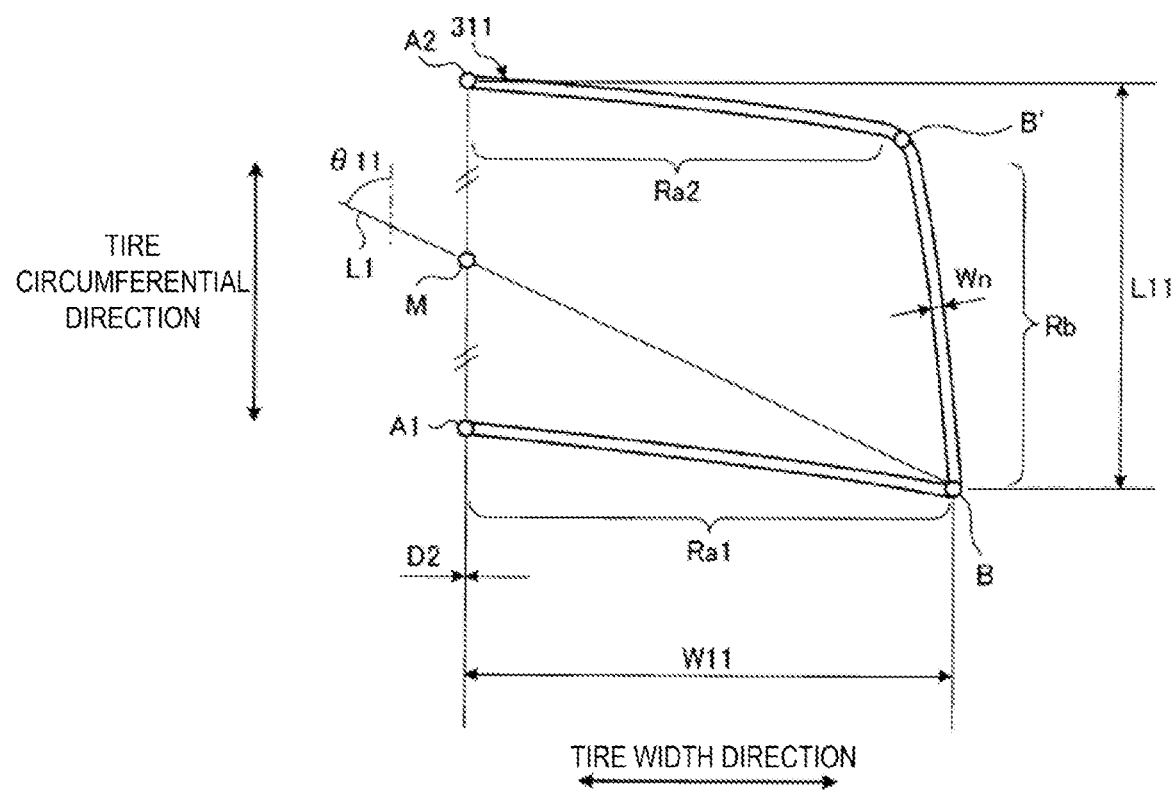
FIG. 19 is an explanatory diagram illustrating a modified example of the narrow shallow groove illustrated in FIG. 8.

In the configuration of FIGS. 18 and 19, the narrow shallow groove 311 has the single and long width direction extending portions Ra1, Ra2 between the points A1, B and between the points A2, B, respectively. In particular, in the configuration of FIG. 19, the points A1, B and the points A2, B are connected with the width direction extending portions Ra1, Ra2.

Effect 1

As described above, this tire 1 includes the pair of shoulder main grooves 21 and one or more center main grooves 22 extending in the tire circumferential direction, and four or more rows of the land portions 31 to 33 defined by the shoulder main grooves 21 and the center main grooves 22 (see FIG. 2). The groove opening portion 211 in the shoulder main groove 21 has the straight shape, or the zigzag shape or the wave-like shape with the amplitude in the tire width direction (see FIG. 3). The groove bottom portion 212 in the shoulder main groove 21 has the zigzag shape or the wave-like shape with the amplitude in the tire width direction. The amplitude A1_sh (A1o_sh, A1i_sh) of the groove opening portion 211 in the shoulder main groove 21 has the relationship A1_sh<A2_sh with respect to the amplitude A2_sh (A2o_sh, A2i_sh) of the groove bottom portion 212.

In the configuration, (1) since the amplitude A1_sh of the groove opening portion 211 in the shoulder main groove 21 is set to be small, the railway wear of the edge portions of the land portions 31, 32, which is likely to occur at the maximum amplitude positions P1io, P1oi to the shoulder main groove 21 side, is suppressed. Additionally, (2) since the amplitude A2_sh of the groove bottom portion 212 in the shoulder main groove 21 is set to be large, the rigidity of the land portions 31, 32 is ensured, and the tear resistance performance of the tire is ensured. Furthermore, (3) the groove opening portion 211 of the shoulder main groove 21 has the zigzag shape or the wave-like shape with the amplitude in the tire width direction, so edge components of the land portions 31, 32 are increased, and the acceleration performance on snow of the tire is improved. This is advantageous in that the acceleration performance on snow, the uneven wear resistance performance, and the tear resistance performance of the tire are provided in a compatible manner.

In the tire 1, the amplitude A1_sh (A1o_sh, A1i_sh) of the groove opening portion 211 in the shoulder main groove 21 has the relationship $1.20 \leq A2\_sh/A1\_sh$ with respect to the amplitude A2_sh (A2o_sh, A2i_sh) of the groove bottom portion 212 (see FIG. 3). As a result, there is an advantage that the rigidity of the land portions 31, 32 is appropriately ensured.

In the tire 1, the wavelength λ2_sh (λ2o_sh, λ2i_sh, see FIG. 3) of the groove bottom portion 212 in the shoulder main groove 21 has the relationship $0.10 \leq \lambda 2\_sh/TW \leq 0.35$ with respect to the tire ground contact width TW (see FIG. 2). This has the advantage that the amplitude A2_sh of the groove bottom portion 212 is made appropriate.

In the tire 1, the outer maximum amplitude positions P1oo, P1io of the groove opening portion 211 in the shoulder main groove 21 are at the identical position in the tire circumferential direction to the outer maximum amplitude positions P2oo, P2io of the groove bottom portion 212 (see FIG. 3). This has the advantage that a reinforcing effect of the rib is enhanced and rib tear resistance performance of the tire is improved.

In the tire 1, the groove opening portion 221 in the center main groove 22 has the straight shape or the zigzag shape or the wave-like shape with the amplitude in the tire width direction, and the groove bottom portion 222 in the center main groove 22 has the zigzag shape or the wave-like shape with the amplitude in the tire width direction. This has the advantage that the acceleration performance on snow of the tire is improved.

In the tire 1, the amplitude A1_ce (A1o_ce, A1i_ce) of the groove opening portion 221 in the center main groove 22 has the relationship $1.05 \leq A2\_ce/A1\_ce$ with respect to the amplitude A2_ce (A2o_ce, A2i_ce) of the groove bottom portion 222 (see FIG. 6). This has the advantage that the uneven wear resistance performance and tear resistance performance of the tire are improved.

In the tire 1, the amplitude A1_ce (A1o_ce, A1i_ce) of the groove opening portion 221 in the center main groove 22 has the relationship $A1\_ce/A1\_sh \leq 0.95$ with respect to the amplitude A1_sh (A1o_sh, A1i_sh) of the groove opening portion 211 in the shoulder main groove 21 (see FIG. 6). This configuration brings the advantage that the shoulder land portion 31 is reinforced and the tear resistance performance of the tire is improved.

In the tire 1, the amplitude A2_ce (A2o_ce, A2i_ce) of the groove bottom portion 222 in the center main groove 22 has the relationship $A2\_ce/A2\_sh \leq 0.75$ with respect to the amplitude A2_sh (A2o_sh, A2i_sh) of the groove bottom portion 212 in the shoulder main groove 21 (see FIG. 6). In such a configuration, (1) since the amplitude A2_sh of the groove bottom portion 212 in the shoulder main groove 21 where a tear is likely to occur is set to be large, there is an advantage that the effect of improving tear resistance performance brought by increasing the amplitude A2_sh of the groove bottom portion 212 is effectively obtained. (2) Since the amplitude A2_ce of the groove bottom portion 222 in the center main groove 22 is set to be small, there is an advantage that a groove volume is ensured and wet performance of the tire is improved.

In the tire 1, the wavelength λ1_ce (λ1o_ce, λ1i_ce) of the groove opening portion 221 in the center main groove 22 has the relationship $0.90 \leq \lambda1\_ce/\lambda1\_sh \leq 1.10$ with respect to the wavelength λ1_sh (λ1o_sh, λ1i_sh) of the groove opening portion 211 in the shoulder main groove 21. This has the advantage that ground contact pressure is decreased at the edge portion in the shoulder land portion 31 and the uneven wear resistance performance of the tire is improved.

In the tire 1, the groove opening portion 211 in the shoulder main groove 21 has the wave-like shape formed by connecting the plurality of arcs projecting toward the tire equatorial plane side (see FIG. 3). In such a configuration, there is an advantage that the uneven wear at the maximum amplitude position is suppressed compared to the edge portion having the zigzag shape.

In the tire 1, the circumferential length (dimension symbol omitted in the drawings) of the arc is not less than 80% with respect to the wavelength λ1_sh (λ1o_sh, λ1i_sh) of the wave-like shape of the groove opening portion 211. This has the advantage that the effect of suppressing the uneven wear at the maximum amplitude position is effectively enhanced.

Effect 2

The tire 1 includes the plurality of main grooves 21, 22 extending in the tire circumferential direction and the plurality of land portions 31 to 33 defined by the main grooves 21, 22 (See FIG. 2). Additionally, at least one row of the land portion (the left and right shoulder land portions 31, 31 in FIG. 2) includes the plurality of narrow shallow grooves 311. The narrow shallow groove 311 has the U-shape with the opening portion facing the tire ground contact edge T side. The narrow shallow groove 311 terminates within the ground contact surface of the land portion 31 (see FIG. 7).

In the configuration, (1) since the narrow shallow groove 311 has the U-shape, there is an advantage that the acceleration performance on snow of the tire during vehicle traveling is improved by circumferential components of the narrow shallow grooves 311, compared to a configuration (not illustrated) including a plurality of width direction narrow grooves having an I-shape disposed in the tire circumferential direction. Additionally, (2) since the narrow shallow groove 311 has the U-shape with the opening portion facing the tire ground contact edge T side, the circumferential components of the narrow shallow grooves in a region on the tire ground contact edge T side can be omitted compared to a configuration (not illustrated) that includes narrow shallow grooves having, for example, an annular structure. As a result, there is an advantage that the noise performance of the tire during vehicle traveling is improved and the uneven wear originating from the narrow shallow groove 311 is suppressed. Additionally, (3) since the narrow shallow grooves 311 have the closed structure in which the narrow shallow grooves 311 terminate within the ground contact surface of the land portion 31, there is an advantage that the noise performance of the tire is improved compared to a configuration (not illustrated) that includes narrow shallow grooves penetrating the ground contact surface of the land portion in the tire width direction or the tire circumferential direction.

In the tire 1, the land portion 31 including the narrow shallow grooves 311 is the rib having the road contact surface continuous in the tire circumferential direction (see FIG. 7). As a result, there is an advantage that the rigidity of the land portion 31 is ensured and the acceleration performance on snow of the tire is improved, and there is an advantage that the noise performance of the tire is improved compared to a configuration (not illustrated) that includes narrow shallow grooves penetrating the ground contact surface of the land portion in the tire width direction.

In the tire 1, the maximum groove width Wn (see FIG. 8) of the narrow shallow groove 311 is in the range $0.1 \text{ mm} \leq Wn \leq 5.0 \text{ mm}$, and the maximum groove depth Hn (see FIG. 9) of the narrow shallow groove 311 has the relationship $0.01 \leq Hn/Hg1 \leq 0.30$ with respect to the maximum groove depth Hg1 of the shoulder main groove 21. As a result, there is an advantage that the maximum groove width Wn and the maximum groove depth Hg1 of the narrow shallow groove 311 are made appropriate.

In the tire 1, the width direction length W11 of the narrow shallow groove 311 has the relationship $0.40 \leq W11/Wb1 \leq 0.90$ with respect to the maximum ground contact width Wb1 of the land portion 31 (see FIG. 7). The lower limit brings an advantage that the edge components of the narrow shallow grooves 311 in the tire circumferential direction are ensured and the effect of improving the acceleration performance on snow of the tire is ensured. The upper limit brings an advantage that the distances D3, D4 (see FIG. 7) between the narrow shallow groove 311 and the edge portions of the land portion 31 are ensured and the rigidity of the land portion 31 is ensured.

In the tire 1, the circumferential length L11 of the narrow shallow groove 311 has the relationship $0.50 \leq L11/P11 \leq 0.90$ with respect to the pitch length P11 of the narrow shallow grooves 311 (see FIG. 7). The lower limit brings an advantage that the circumferential components of the U-shapes of the narrow shallow grooves 311 are ensured and the acceleration performance on snow of the tire during vehicle traveling is ensured. The upper limit brings an advantage that degradation of the noise performance of the tire due to the excessive circumferential components of the narrow shallow grooves 311 is suppressed.

In the tire 1, the distance D1 between the pair of terminating end points A1, A2 of the narrow shallow groove 311 in the tire circumferential direction has the relationship $0.30 \leq D1/P11 \leq 0.90$ with respect to the pitch length P11 of the narrow shallow grooves 311 (see FIG. 7). The lower limit brings an advantage that the opening width of the U-shape of the narrow shallow groove 311 is ensured and the degradation of the noise performance of the tire is suppressed. The upper limit brings an advantage that the interval between the terminating end points A1, A2 of the adjacent narrow shallow grooves 311, 311 is ensured.

In the tire 1, the distance D2 (see FIG. 8) between the pair of terminating end points A1, A2 of the narrow shallow groove 311 in the tire width direction has the relationship $0 \leq D2/Wb1 \leq 0.70$ with respect to the maximum ground contact width Wb1 (see FIG. 7) of the land portion 31. In such a configuration, the pair of terminating end points A1, A2 of the narrow shallow groove 311 are at the identical position in the tire width direction, and this brings an advantage that the rigidity of the shoulder land portion 31 is made uniform and the uneven wear resistance of the shoulder land portion 31 is suppressed.

In the tire 1, when the pair of terminating end points A1, A2 and the innermost point B in the tire width direction of the narrow shallow groove 311 are defined and the imaginary line L1 passing through the midpoint M of the terminating end points A1, A2 and the innermost point B is defined, the angle θ11 formed by the imaginary line L1 and the tire circumferential direction is in the range $45$ degrees $\leq \theta 11 \leq 135$ degrees (see FIG. 8). This has advantages that the opening direction of the U-shape of the narrow shallow groove 311 is made appropriate and the noise performance of the tire during vehicle traveling is improved.

In the tire 1, the U-shape of the narrow shallow groove 311 includes at least one of the width direction extending portions Ra1, Ra2 having the inclination angle of not less than 75 degrees and not greater than 105 degrees with respect to the tire circumferential direction (see FIG. 8). The sum total ΣLa of the width direction lengths La1 to La4 of the width direction extending portions Ra1, Ra2 have the relationship $1.00 \leq \Sigma La/W11$ with respect to the width direction length W11 of the narrow shallow groove 311. In such a configuration, the sum total ΣLa of the width direction extending portions Ra1, Ra2 extending substantially perpendicular to the tire circumferential direction is ensured. As a result, there is an advantage that the effect of improving the acceleration performance on snow when the vehicle travels straight by the narrow shallow grooves 311 is efficiently ensured.

In the tire 1, the U-shape of the narrow shallow groove 311 includes the pair of width direction extending portions Ra1, Ra1; Ra2, Ra2 adjacent to one another, and the bent portions (reference sign is omitted in the drawings) having the crank shape or the S-shape that connect the pair of width direction extending portions Ra1, Ra1; Ra2, Ra2 (see FIG. 8). This has an advantage that the circumferential components of the narrow shallow grooves 311 are increased and the noise performance of the tire during vehicle traveling is improved.

In the tire 1, the U-shape of the narrow shallow groove 311 includes the continuous circumferential extending portion Rb having the inclination angle of not less than 0 degrees and not greater than 15 degrees with respect to the tire circumferential direction (see FIG. 8). The circumferential length Lb of the circumferential extending portion Rb has the relationship $0.50 \leq Lb/L11$ with respect to the circumferential length L11 of the narrow shallow groove 311. In such a configuration, the length Lb of the circumferential extending portion Rb extending substantially parallel to the tire circumferential direction is ensured. As a result, there is an advantage that the effect of improving the acceleration performance on snow during vehicle traveling by the narrow shallow grooves 311 is efficiently ensured.

Target of Application

The tire 1 is a heavy duty tire mounted on a steering axle of a vehicle. The use of such a tire as the target of application brings an advantage that the effects of improving the uneven wear resistance performance and the tear resistance performance of the tire are effectively obtained, and a demand for the acceleration performance on snow in an all-season tire is satisfied.

In the embodiments, a pneumatic tire has been described as an example of the tire as described above. However, no such limitation is intended. The configurations that have been described in the embodiments can be optionally applied to other tires within the scope apparent to those skilled in the art. Examples of other tires include airless tires and solid tires.

Example 1

FIGS. 20A-20B include a table showing results of performance tests of tires according to the embodiments of the technology.

In the performance tests, (1) acceleration performance on snow, (2) uneven wear resistance performance, and (3) tear resistance performance were evaluated for a plurality of kinds of test tires. Test tires having a tire size of 315/70R22.5 are mounted on rims having a rim size of 22.5×9.00", and an internal pressure of 900 kPa and a load specified by JATMA are applied to the test tires. The test tires are mounted on steering axles of a 4×2 tractor.

(1) The acceleration performance on snow is evaluated by measuring a distance required for acceleration from a specified initial speed to a termination speed under test conditions in accordance with Economic Commission for Europe (ECE) Regulation No. 117 Revision 2 (R117-2). In this evaluation, larger values are preferable.

(2) In the evaluation of uneven wear resistance performance, after the test vehicle is driven for 40000 km on a paved road, a degree of railway wear of a main groove is observed, and evaluated with Conventional Example being assigned as the reference (100). In this evaluation, larger values are preferable.

(3) In the evaluation of tear resistance performance, the test vehicle performs cornering and after riding over a curb having the height of 200 mm 20 times, occurrence of a tear in a shoulder land portion is observed. The observation results are expressed as index values and evaluated with Conventional Example being assigned as the reference (100). Larger values are preferable.

The test tires of Examples 1 to 13 have the configurations of FIGS. 1 and 2. The shoulder main grooves 21 and the center main grooves 22 have the groove depths of 14.6 mm and the groove widths of 15.3 mm. The through lug grooves 321, 331 have the maximum groove widths W21 of 2.1 mm and the maximum groove depths H21 of 2.5 mm. The tire ground contact widths TW are 268 mm, the maximum ground contact widths Wb1 of the shoulder land portions 31 are 49.5 mm, the maximum ground contact widths Wb2 of the middle land portions 32 are 36.0 mm, and the maximum ground contact widths Wb3 of the center land portions 33 are 36.0 mm.

The test tire of Conventional Example 1 in the test tire of Example 1 includes the edge portions of the groove opening portions 211, 221 and the groove bottom portions 212, 222 in the main grooves 21, 22 having a straight shape. The test tire of Conventional Example 2 in the test tire of Example 1 has constant amplitude ratios A2o_sh/A1o_sh and A2i_sh/A1i_sh of the groove opening portions 211, 221 and the groove bottom portions 212, 222 in the main grooves 21, 22.

As can be seen from the test results, the acceleration performance on snow, the uneven wear resistance performance, and the tear resistance performance of the tire are provided in a compatible manner in the test tires of Examples 1 to 13.

Second Embodiment

Figure 22:
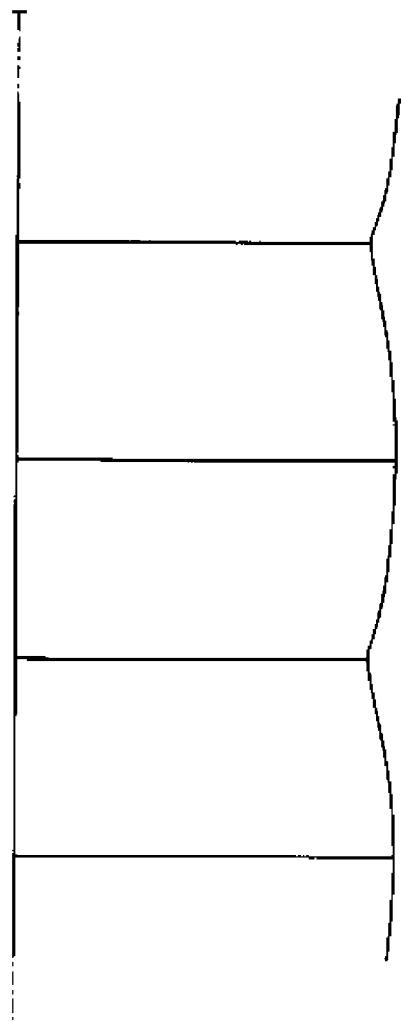
FIG. 22 is an explanatory diagram illustrating a shoulder land portion of a test tire of Comparative Example shown in FIG. 21.

FIG. 21 is a table showing results of performance tests of tires according to embodiments of the technology. FIG. 22 is an explanatory diagram illustrating a shoulder land portion of a test tire of Comparative Example shown in FIG. 21.

In the performance tests, (1) acceleration performance on snow and (2) pass-by noise performance were evaluated for a plurality of kinds of test tires. Test tires having a tire size of 315/70R22.5 are mounted on rims having a rim size of 22.5×9.00", and an internal pressure of 900 kPa and a load specified by JATMA are applied to the test tires. The test tires are mounted on steering axles of a 4×2 tractor.

(1) The acceleration performance on snow is evaluated by measuring a distance required for acceleration from a specified initial speed to a termination speed under test conditions in accordance with Economic Commission for Europe (ECE) Regulation No. 117 Revision 2 (R117-2). In this evaluation, larger values are preferable. The value of 96 or higher is deemed that the performance is properly ensured.

(2) The evaluation of the pass-by noise performance measures pass-by noise of the vehicle under test conditions in accordance with ECE R117-2. Based on the measurement results, a decibel difference with Comparative Example being assigned as the reference (0) is calculated. Smaller values are preferable.

The test tires of Examples 14 to 24 have the configurations of FIGS. 1, 2, and 7. The shoulder main grooves 21 and the center main grooves 22 have the groove depths of 14.6 mm and the groove widths of 15.3 mm. The through lug grooves 321, 331 have the maximum groove widths W21 of 2.1 mm and the maximum groove depths H21 of 2.5 mm. The tire ground contact widths TW are 268 mm, the maximum ground contact widths Wb1 of the shoulder land portions 31 are 49.5 mm, the maximum ground contact widths Wb2 of the middle land portions 32 are 36.0 mm, and the maximum ground contact widths Wb3 of the center land portions 33 are 36.0 mm. The pitch numbers of the zigzag shapes of the groove opening portions 211, 221 of the main grooves 21, 22 are not less than 50 and not greater than 100.

The test tire of Comparative Example in the test tire of Example 14 includes narrow shallow grooves having a straight shape and penetrating a shoulder land portion (see FIG. 22).

As can be seen from the test results, the test tires of Examples 14 to 24 can improve the pass-by noise performance during vehicle traveling while maintaining the acceleration performance on snow of the tire.

The invention claimed is:

1. A tire, comprising:
   a pair of shoulder main grooves and one or more center main grooves extending in a tire circumferential direction; and
   four or more rows of land portions defined by the pair of shoulder main grooves and the one or more center main grooves,
   each of the pair of shoulder main grooves comprising a groove opening portion having a wave-like shape with an amplitude in a tire width direction,
   each of the pair of shoulder main grooves comprising a groove bottom portion having a zigzag shape or a wave-like shape with an amplitude in the tire width direction,
   the groove opening portion in each of the pair of shoulder main grooves having an amplitude A1_sh having a relationship A1_sh<A2_sh with respect to an amplitude A2_sh of the groove bottom portion, and
   the groove opening portion in each of the pair of shoulder main grooves comprising a pair of edge portions formed by connecting a plurality of arcs projecting to a tire equatorial plane side.

2. The tire according to claim 1, wherein the amplitude A1_sh of the groove opening portion in each of the pair of shoulder main grooves has a relationship $1.20 \leq A2\_sh/A1\_sh$ with respect to the amplitude A2_sh of the groove bottom portion.

3. The tire according to claim 1, wherein the groove bottom portion in each of the pair of shoulder main grooves has a wavelength λ2_sh having a relationship $0.10 \leq \lambda2\_sh/TW \leq 0.35$ with respect to a tire ground contact width TW.

4. The tire according to claim 1, wherein an outer maximum amplitude position of the groove opening portion in each of the pair of shoulder main grooves is at a position in the tire circumferential direction identical to an outer maximum amplitude position of the groove bottom portion.

5. The tire according to claim 1, wherein
   each of the one or more center main grooves comprising a groove opening portion having a zigzag shape or a wave-like shape with an amplitude in the tire width direction, and
   each of the one or more center main grooves comprising a groove bottom portion having a zigzag shape or a wave-like shape with an amplitude in the tire width direction.

6. The tire according to claim 5, wherein the groove opening portion in each of the one or more center main grooves has an amplitude A1_ce having a relationship $1.05 \leq A2\_ce/A1\_ce$ with respect to an amplitude A2_ce of the groove bottom portion.

7. The tire according to claim 5, wherein the groove opening portion in each of the one or more center main grooves has an amplitude A1_ce having a relationship $A1\_ce/A1\_sh \leq 0.95$ with respect to the amplitude A1_sh of the groove opening portion in each of the pair of shoulder main grooves.

8. The tire according to claim 5, wherein the groove bottom portion in each of the one or more center main grooves has an amplitude A2_ce having a relationship $A2\_ce/A2\_sh \leq 0.90$ with respect to an amplitude A2_sh of the groove bottom portion in each of the pair of shoulder main grooves.

9. The tire according to claim 5, wherein the groove opening portion in each of the one or more center main grooves has a wavelength λ1_ce having a relationship $0.90 \leq \lambda 1\_ce/\lambda 1\_sh \leq 1.10$ with respect to a wavelength $\lambda 1\_sh$ of the groove opening portion in each of the pair of shoulder main grooves.

10. The tire according to claim 1, wherein each of the arcs has a circumferential length of not less than 80% with respect to a wavelength of the wave-like shape of the groove opening portion.

11. The tire according to claim 1 that is a heavy duty tire mounted on a steering axle of a vehicle.

12. The tire according to claim 2, wherein the groove bottom portion in each of the pair of shoulder main grooves has a wavelength $\lambda 2\_sh$ having a relationship $0.10 \leq \lambda 2\_sh/TW \leq 0.35$ with respect to a tire ground contact width TW.

13. The tire according to claim 12, wherein an outer maximum amplitude position of the groove opening portion in each of the pair of shoulder main grooves is at a position in the tire circumferential direction identical to an outer maximum amplitude position of the groove bottom portion.

14. The tire according to claim 13, wherein
each of the one or more center main grooves comprising a groove opening portion having a zigzag shape or a wave-like shape with an amplitude in the tire width direction, and
each of the one or more center main grooves comprising a groove bottom portion having a zigzag shape or a wave-like shape with an amplitude in the tire width direction.

15. The tire according to claim 14, wherein the groove opening portion in each of the one or more center main grooves has an amplitude $A1\_ce$ having a relationship $1.05 \leq A2\_ce/A1\_ce$ with respect to an amplitude $A2\_ce$ of the groove bottom portion.

16. The tire according to claim 15, wherein the groove opening portion in each of the one or more center main grooves has an amplitude $A1\_ce$ having a relationship $A1\_ce/A1\_sh \leq 0.95$ with respect to the amplitude $A1\_sh$ of the groove opening portion in each of the pair of shoulder main grooves.

17. The tire according to claim 16, wherein the groove bottom portion in each of the one or more center main grooves has an amplitude $A2\_ce$ having a relationship $A2\_ce/A2\_sh \leq 0.90$ with respect to an amplitude $A2\_sh$ of the groove bottom portion in each of the pair of shoulder main grooves.

18. The tire according to claim 17, wherein the groove opening portion in each of the one or more center main grooves has a wavelength $\lambda 1\_ce$ having a relationship $0.90 \leq \lambda 1\_ce/\lambda 1\_sh \leq 1.10$ with respect to a wavelength $\lambda 1\_sh$ of the groove opening portion in each of the pair of shoulder main grooves.

19. A tire, comprising:
a pair of shoulder main grooves and one or more center main grooves extending in a tire circumferential direction; and
four or more rows of land portions defined by the pair of shoulder main grooves and the one or more center main grooves,
each of the pair of shoulder main grooves comprising a groove opening portion having a zigzag shape or a wave-like shape with an amplitude in a tire width direction,
each of the pair of shoulder main grooves comprising a groove bottom portion having a zigzag shape or a wave-like shape with an amplitude in the tire width direction, and
the groove opening portion in each of the pair of shoulder main grooves having an amplitude $A1\_sh$ having a relationship $A1\_sh < A2\_sh$ with respect to an amplitude $A2\_sh$ of the groove bottom portion; wherein
in the groove opening portion in the pair of shoulder main grooves, outer edge portions and inner edge portions in the tire width direction are defined and an average value of groove wall angles of the inner edge portion in the shoulder main grooves is set to be greater than an average value of groove wall angles of the outer edge portion and
the groove opening portion in each of the pair of shoulder main grooves having the wave-like shape being formed by connecting a plurality of arcs projecting to a tire equatorial plane side.

* * * * *